United States Patent
Taguchi

(10) Patent No.: US 11,808,714 B2
(45) Date of Patent: Nov. 7, 2023

(54) INSPECTION DEVICE, BLISTER PACKAGING MACHINE, AND BLISTER SHEET MANUFACTURING METHOD

(71) Applicant: CKD CORPORATION, Aichi (JP)

(72) Inventor: Yukihiro Taguchi, Aichi (JP)

(73) Assignee: CKD CORPORATION, Aichi (JP)

(*) Notice: Subject to any disclaimer, the term of this patent is extended or adjusted under 35 U.S.C. 154(b) by 376 days.

(21) Appl. No.: 17/201,611

(22) Filed: Mar. 15, 2021

(65) Prior Publication Data

US 2021/0199594 A1 Jul. 1, 2021

Related U.S. Application Data

(63) Continuation of application No. PCT/JP2019/030669, filed on Aug. 5, 2019.

(30) Foreign Application Priority Data

Oct. 10, 2018 (JP) .................... 2018-191570

(51) Int. Cl.
*G01N 21/90* (2006.01)
*B65B 1/02* (2006.01)
(Continued)

(52) U.S. Cl.
CPC .......... *G01N 21/9027* (2013.01); *B65B 1/02* (2013.01); *B65B 1/04* (2013.01); *B65B 47/04* (2013.01);
(Continued)

(58) Field of Classification Search
CPC .. B07C 5/342; B65B 1/02; B65B 1/04; B65B 47/04; B65B 5/103; B65B 57/02;
(Continued)

(56) References Cited

U.S. PATENT DOCUMENTS

| 6,316,772 B1* | 11/2001 | Egelberg ............ G01N 21/3577 250/339.02 |
| 2020/0369422 A1* | 11/2020 | Taguchi ................. G01N 21/35 |
| 2021/0278350 A1* | 9/2021 | Taguchi ............... G01N 21/359 |

FOREIGN PATENT DOCUMENTS

| WO | 2005/038443 A1 | 4/2005 |
| WO | 2013/002291 A1 | 1/2013 |

OTHER PUBLICATIONS

International Preliminary Report on Patentability issued for PCT/JP2019/030669, dated Apr. 8, 2021 (11 pages).
(Continued)

*Primary Examiner* — Peter B Kim
(74) *Attorney, Agent, or Firm* — Osha Bergman Watanabe & Burton LLP

(57) ABSTRACT

An inspection device includes: an illumination device that irradiates an object with near-infrared light; a spectroscope that disperses reflected light from the object irradiated with the near-infrared light; an imaging device that takes a spectroscopic image of the reflected light dispersed by the spectroscope; and a processor. The processor obtains spectral data at a plurality of points on the object based on the spectroscopic image obtained by the imaging device, selects, from among the spectral data at the plurality of points, a group having a highest density of luminance values of a predetermined wavelength component as a dense spectral data group, and performs a predetermined analysis for the object based on the dense spectral data group and detects a different type of object.

6 Claims, 12 Drawing Sheets

(51) Int. Cl.
*B65B 1/04* (2006.01)
*B65B 47/04* (2006.01)
*B65B 57/02* (2006.01)
*G01N 21/88* (2006.01)

(52) U.S. Cl.
CPC ......... *B65B 57/02* (2013.01); *G01N 21/8806* (2013.01); *G01N 2201/061* (2013.01)

(58) Field of Classification Search
CPC ..... B65B 57/12; B65B 9/045; B01N 21/8806; B01N 21/8851; B01N 21/9027; B01N 21/9508; B01N 2201/061
See application file for complete search history.

(56) References Cited

OTHER PUBLICATIONS

International Search Report issued in corresponding International Application No. PCT/JP2019/030669 dated Oct. 8, 2019 (3 pages).

* cited by examiner

FIG. 14

| BAND No.→ | 1 | 6 | 11 | 16 | 21 | 26 | 31 | 36 | 41 | ...... | 96 |
|---|---|---|---|---|---|---|---|---|---|---|---|
| PIXEL 0 | 0.504763 | 1.148232 | 1.346885 | 1.438718 | 1.467416 | 1.602934 | 1.591454 | 1.634501 | 1.328072 | ...... | 0.076209 |
| PIXEL 1 | 0.520141 | 1.191003 | 1.350644 | 1.439846 | 1.431849 | 1.561038 | 1.553348 | 1.606254 | 1.331573 | ...... | 0.051983 |
| PIXEL 2 | 0.494358 | 1.127546 | 1.331181 | 1.426979 | 1.458741 | 1.602438 | 1.597571 | 1.623441 | 1.340402 | ...... | 0.054046 |
| PIXEL 3 | 0.479477 | 1.100600 | 1.274822 | 1.472835 | 1.492600 | 1.592521 | 1.620338 | 1.650351 | 1.335580 | ...... | 0.083451 |
| PIXEL 4 | 0.517897 | 1.177852 | 1.369128 | 1.472036 | 1.469799 | 1.562267 | 1.515287 | 1.637211 | 1.307233 | ...... | 0.067114 |
| PIXEL 5 | 0.504127 | 1.193405 | 1.349226 | 1.424753 | 1.412288 | 1.550877 | 1.524112 | 1.640703 | 1.314029 | ...... | 0.078460 |
| PIXEL 6 | 0.491179 | 1.189772 | 1.375549 | 1.447881 | 1.445099 | 1.558543 | 1.547106 | 1.615110 | 1.310944 | ...... | 0.063368 |
| PIXEL 7 | 0.511049 | 1.175413 | 1.375290 | 1.465007 | 1.475512 | 1.595325 | 1.579426 | 1.642739 | 1.327308 | ...... | 0.055080 |
| PIXEL 8 | 0.502492 | 1.120879 | 1.313750 | 1.483529 | 1.484812 | 1.569059 | 1.563072 | 1.618667 | 1.313750 | ...... | 0.096222 |
| PIXEL 9 | 0.506263 | 1.115441 | 1.293960 | 1.398854 | 1.416666 | 1.542539 | 1.527102 | 1.609434 | 1.326417 | ...... | 0.079957 |

INSPECTION DEVICE, BLISTER PACKAGING MACHINE, AND BLISTER SHEET MANUFACTURING METHOD

BACKGROUND

Technical Field

The present invention relates to an inspection device configured to perform an inspection for inclusion of any different type of object by taking advantage of spectral analysis, a Press Through Package (PTP) packaging machine, and a method of manufacturing the PTP sheet.

Description of Related Art

A PTP sheet is generally comprised of a container film provided with pocket portions formed to be filled with an object, such as tablets, and a cover film mounted to the container film such as to seal an opening side of the pocket portions.

In manufacture of the PTP sheet, a different type inclusion inspection is performed to check for inclusion of any different type of object. A known method of such an inspection irradiates an object with near-infrared light, disperses reflected light from the object by a spectroscope, and performs an analysis (for example, principal component analysis), based on spectral data obtained by taking an image of the dispersed reflected light, so as to detect inclusion of any different type of the object.

A general procedure of performing the analysis based on the spectral data averages spectral data at a plurality of points on an object to calculate average spectral data with respect to the object and identifies the type of the object, based on the average spectral data (as described in, for example, Patent Literature 1).

Another procedure detects a center position of each object, averages spectral data at a plurality of points in a neighborhood of the center position to calculate average spectral data with respect to the object, and identifies the type of the object, based on the average spectral data (as described in, for example, Patent Literature 2).

PATENT LITERATURES

Patent Literature 1: WO 2013/002291A
Patent Literature 2: WO 2005/038443A

The procedure of simply averaging spectral data in a predetermined area on an object like the procedures of Patent Literatures 1 and 2 described above may, however, fail to give appropriate average spectral data with respect to the object.

For example, when the object is a tablet (plain tablet) produced by mixing various active ingredients with a diluting agent and the like and compression molding the mixture, the spectral data is likely to be affected by a concave and convex structure on the surface of the tablet, in addition to the microscopic heterogeneity of the tablet.

More specifically, spectral data at coordinate points affected by various factors, for example, the mixing state of the various active ingredients and the like, shadow portions arising in a marked portion, a scored line portion, an outer periphery and the like of the tablet, and shine caused by specularly reflected light occurring on a protrusion or the like on the tablet are out of a group of spectral data at coordinate points that appropriately reflect the characteristic of the tablet. This is likely to cause a significant variation in data at respective coordinate points even on an identical tablet and to fail to maintain the uniformity.

SUMMARY

By taking into account the circumstances described above, one or more embodiments of the present invention provide an inspection device configured to enhance the inspection accuracy in a different type inclusion inspection performed by taking advantage of spectral analysis, as well as a PTP packaging machine and a manufacturing method of a PTP sheet.

The following describes embodiments of the present invention. Functions and advantageous effects that are characteristic of one or more embodiments are also described as appropriate.

One or more embodiments provide an inspection device comprising an irradiation unit configured to irradiate an object with near-infrared light; a spectral unit configured to disperse reflected light that is reflected from the object irradiated with the near-infrared light; an imaging unit (i.e., an imaging device) configured to take a spectroscopic image of the reflected light dispersed by the spectral unit; a spectral data obtaining module (i.e., a processor) configured to obtain spectral data at a plurality of points (a plurality of coordinate positions) on the object, based on the spectroscopic image obtained by the imaging unit; a dense spectral data group selecting module (i.e., the processor) configured to select a group having a highest density of luminance values with regard to a predetermined wavelength component as a dense spectral data group, among the spectral data at the plurality of points; and an analyzing module (i.e., the processor) configured to perform a predetermined analysis (for example, principal component analysis) for the object, based on the dense spectral data group, and thereby detect a different type of object.

The configuration of one or more embodiments selects the group having the highest density of luminance values with regard to the predetermined wavelength component (a wavelength component reflecting the characteristic of the object) (dense spectral data group), among the spectral data at the plurality of points. Even when there is a variation in data at a plurality of coordinate points on one object, this configuration excludes spectral data with respect to singular points on the object (spectral data that seems not to appropriately reflect the characteristic of the object).

This configuration enables more appropriate spectral data suitable for spectral analysis of the object to be obtained, compared with, for example, a configuration that simply averages spectral data at a plurality of points on the object. As a result, this significantly enhances the inspection accuracy in a different type inclusion inspection.

According to a modification, the inspection device may comprise a normalization module configured to normalize luminance values of each wavelength component in the spectral data obtained by the spectral data obtaining module. The dense spectral data group selecting module may use the "normalized luminance values" in place of the "luminance values" described above to select the group having the highest density of luminance values with regard to the predetermined wavelength component as the dense spectral data group, among the spectral data at the plurality of points In the inspection device described above, the dense spectral data group selecting module may specify a group having a smaller standard deviation of the luminance values with regard to the predetermined wavelength component, as the group having the highest density of the luminance values, among the spectral data at the plurality of points.

The configuration of one or more embodiments enables the dense spectral data group to be selected by a relatively simple arithmetic operation.

The inspection device described above may further comprise a sorting module (i.e., the processor) configured to sort the luminance values with regard to the predetermined wavelength component in the spectral data at the plurality (a natural number of not less than five) of points, in a predetermined order of either an ascending order or a descending order (an ascending sequence or a descending sequence). The dense spectral data group selecting module may perform a process of using a first specific luminance value group consisting of a first predetermined number of luminance values with regard to the predetermined wavelength component arrayed in the predetermined order to calculate a standard deviation with respect to each luminance value group consisting of a second predetermined number of consecutively arrayed luminance values, wherein the second predetermined number is smaller than the first predetermined number, and specifying a luminance value group having a minimum standard deviation as a second specific luminance value group. The dense spectral data group selecting module may specify a group of spectral data corresponding to a luminance value group obtained by repeatedly performing the process a predetermined number of times with setting the second specific luminance value group to the first specific luminance value group, as the group having the highest density of the luminance values.

The configuration of one or more embodiments gradually narrows the group having the high density of luminance values in a stepwise manner and thereby enables the dense spectral data group to be selected with the higher accuracy.

One or more embodiments provide a PTP packaging machine configured to manufacture a PTP sheet configured such that a predetermined object is placed in a pocket portion formed in a container film and that a cover film is mounted to the container film so as to close the pocket portion. The PTP packaging machine comprises a pocket portion forming unit (i.e., a pocket portion former) configured to form the pocket portion in the container film in a belt-like form; a filling unit (i.e., a filler) configured to fill the pocket portion with the object; a mounting unit (i.e., a mounter) configured to mount the cover film in a belt-like form to the container film with the pocket portion filled with the object, so as to close the pocket portion; a separation unit (i.e., a separator) configured to separate the PTP sheet from a belt-like body (a PTP film in a belt-like form) obtained by mounting the cover film to the container film (including a punching unit configured to punch out in the unit of a sheet); and the inspection device described above.

The configuration of the PTP packaging machine provided with the inspection device described above, like the configuration of one or more embodiments, has advantages, for example, efficiently excluding a defective product containing a different type of object in the manufacturing process of the PTP sheet. Furthermore, the PTP packaging machine may be provided with a discharge unit configured to discharge a PTP sheet determined as defective by the inspection device.

In the configuration of one or more embodiments, the inspection device described above may be placed in "a previous process before the pocket portion is filled with the object by the filling unit". This configuration allows for exclusion of a different type of object in a pervious stage before the pocket portion is filled with the object and accordingly reduces the number of PTP sheets determined as defective products.

The inspection device described above may be placed in "a post process after the pocket portion is filled with the object by the filling unit and a previous process before the cover film is mounted to the container film by the mounting unit". This configuration enables an inspection to be performed without any interference with the object and thereby further enhances the inspection accuracy.

The inspection device described above may be placed in "a post process after the cover film is mounted to the container film by the mounting unit and a previous process before the PTP sheet is separated by the separation unit". This configuration enables an inspection to be performed in such a state that the objects are not exchanged and thereby further enhances the inspection accuracy.

The inspection device described above may be placed in "a post process after the PTP sheet is separated by the separation unit". This configuration enables a check for inclusion of any defective product to be performed in a final stage.

One or more embodiments provide a manufacturing method of a PTP sheet to manufacture a PTP sheet configured such that a predetermined object is placed in a pocket portion formed in a container film and that a cover film is mounted to the container film so as to close the pocket portion. The manufacturing method comprises a pocket portion forming process of forming the pocket portion in the container film in a belt-like form; a filling process of filling the pocket portion with the object; a mounting process of mounting the cover film in a belt-like form to the container film with the pocket portion filled with the object, so as to close the pocket portion; a separation process of separating the PTP sheet from a belt-like body (a PTP film in a belt-like form) obtained by mounting the cover film to the container film (including a punching process of punching out in the unit of a sheet); and an inspection process of performing an inspection for inclusion of a different type of object.

The inspection process comprises an irradiation process of irradiating an object with near-infrared light; a dispersion process of dispersing reflected light that is reflected from the object irradiated with the near-infrared light; an imaging process an (exposure process) of taking a spectroscopic image of the dispersed reflected light; a spectral data obtaining process of obtaining spectral data at a plurality of points on the object, based on the spectroscopic image; a dense spectral data group selecting process of selecting a group having a highest density of luminance values with regard to a predetermined wavelength component as a dense spectral data group, among the spectral data at the plurality of points; and an analyzing process of performing a predetermined analysis (for example, principal component analysis) for the object, based on the dense spectral data group, so as to detect a different type of object.

The configuration of one or more embodiments has similar functions and advantageous effects to those described above.

In the configuration of one or more embodiments, the inspection process described above may be performed "before the filling process". This configuration allows for exclusion of a different type of object in a pervious stage before the pocket portion is filled with the object and accordingly reduces the number of PTP sheets determined as defective products.

The inspection process described above may be performed "after the filling process and before the mounting process". This configuration enables an inspection to be performed without any interference with the object and thereby further enhances the inspection accuracy.

The inspection process described above may be performed "after the mounting process and before the separation process". This configuration enables an inspection to be performed in such a state that the objects are not exchanged and thereby further enhances the inspection accuracy.

The inspection process described above may be performed "after the separation process". This configuration enables a check for inclusion of any defective product to be performed in a final stage.

According to a modification, the inspection process may further comprise a normalization process of normalizing luminance values of each wavelength component in the spectral data obtained in the spectral data obtaining process. The dense spectral data group selecting process may be configured to use the "normalized luminance values" in place of the "luminance values" described above, in order to select the group having the highest density of luminance values with regard to the predetermined wavelength component as the dense spectral data group, among the spectral data at the plurality of points According to another modification, the dense spectral data group selecting process may be configured to specify a group having a smaller standard deviation of the luminance values with regard to the predetermined wavelength component, as the group having the highest density of the luminance values, among the spectral data at the plurality of points.

According to another modification, the inspection process may further comprise a sorting process of sorting the luminance values with regard to the predetermined wavelength component in the spectral data at the plurality (a natural number of not less than five) of points, in a predetermined order of either an ascending order or a descending order (an ascending sequence or a descending sequence). The dense spectral data group selecting process may be configured to perform a process of using a first specific luminance value group consisting of a first predetermined number of luminance values with regard to the predetermined wavelength component arrayed in the predetermined order to calculate a standard deviation with respect to each luminance value group consisting of a second predetermined number of consecutively arrayed luminance values, wherein the second predetermined number is smaller than the first predetermined number, and specifying a luminance value group having a minimum standard deviation as a second specific luminance value group. The dense spectral data group selecting process may also be configured to specify a group of spectral data corresponding to a luminance value group obtained by repeatedly performing the process a predetermined number of times with setting the second specific luminance value group to the first specific luminance value group, as the group having the highest density of the luminance values.

BRIEF DESCRIPTION OF DRAWINGS

FIG. 14 is a table showing one example of spectral data obtained at the plurality of coordinate points on the tablet.

DETAILED DESCRIPTION OF EMBODIMENTS

The following describes embodiments of the present invention with reference to drawings. The configuration of a PTP sheet is described first in detail.

Figure 1A:
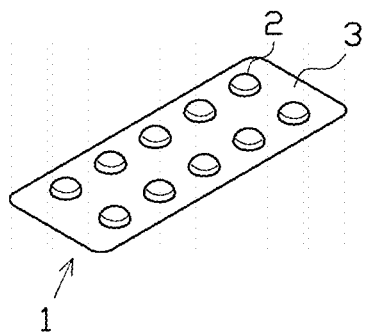
FIG. 1A is a perspective view illustrating a PTP sheet.
Figure 1B:
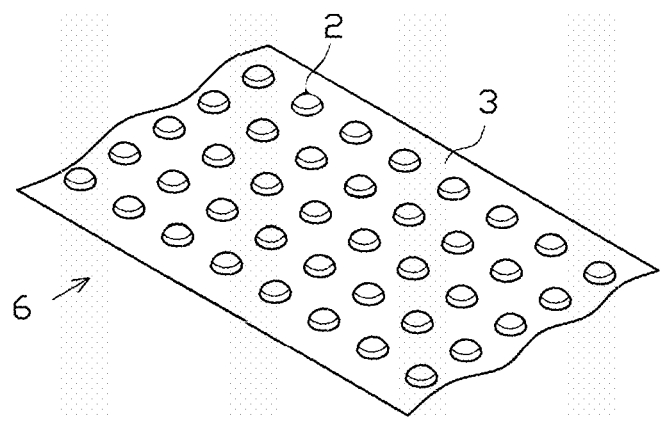
FIG. 1B is a perspective view illustrating a PTP film.
Figure 2:
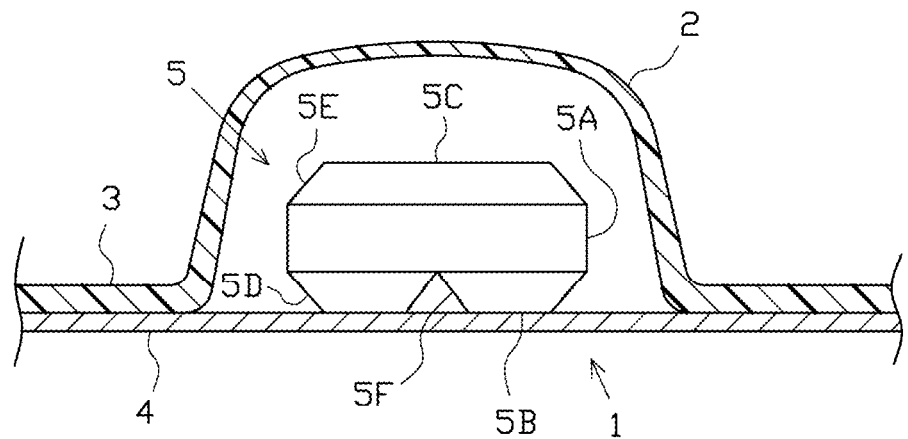
FIG. 2 is a partly enlarged sectional view illustrating a pocket portion of the PTP sheet.

As shown in FIGS. 1A-1B and FIG. 2, a PTP sheet 1 includes a container film 3 provided with a plurality of pocket portions 2, and a cover film 4 mounted to the container film 3 such as to close the respective pocket portions 2.

The container film 3 of one or more embodiments is made of a transparent or translucent thermoplastic resin material, such as PP (polypropylene) or PVC (polyvinyl chloride), and has translucency. The cover film 4 is, on the other hand, made of an opaque material (for example, aluminum foil) with a sealant made of, for example, a polypropylene resin and provided on the surface thereof.

The PTP sheet 1 is formed in an approximately rectangular shape in plan view. The PTP sheet 1 is configured such that two pocket arrays are formed along a sheet short side direction and that each pocket array includes five pocket portions 2 arranged along a sheet longitudinal direction. Accordingly, the PTP sheet 1 has a total of ten pocket portions 2. One tablet 5 is placed as an object in each of the pocket portions 2.

As shown in FIG. 2, the tablet 5 of one or more embodiments is a disk-shaped plain tablet having a circular shape in plan view and is configured to have a side face 5A and a flat surface 5B and a flat rear face 5C placed across the side face 5A. According to one or more embodiments, the tablet 5 is placed in the pocket portion 2 such that the surface 5B faces a cover film 4-side and the rear face 5C faces a bottom wall-side (top wall-side) of the pocket portion 2.

The tablet 5 also has a tapered portion 5D formed by chamfering a boundary between the side face 5A and the surface 5B and a tapered portion 5E by chamfering a boundary between the side face 5A and the rear face 5C.

Furthermore, a groove-like score line 5F is marked on the surface 5B of the tablet 5 to pass through the center of the surface 5B and to be extended linearly. The score line 5F is marked only on the surface 5B and is not marked on the rear face 5C.

The PTP sheet 1 (shown in FIG. 1A) is manufactured by punching sheets from a PTP film 6 in a belt-like form (shown in FIG. 1B), which is comprised of the container film 3 in a belt-like form and the cover film 4 in a belt-like form.

The following describes the general configuration of a PTP packaging machine 10 used to manufacture the PTP sheet 1 described above, with reference to FIG. 3.

Figure 3:
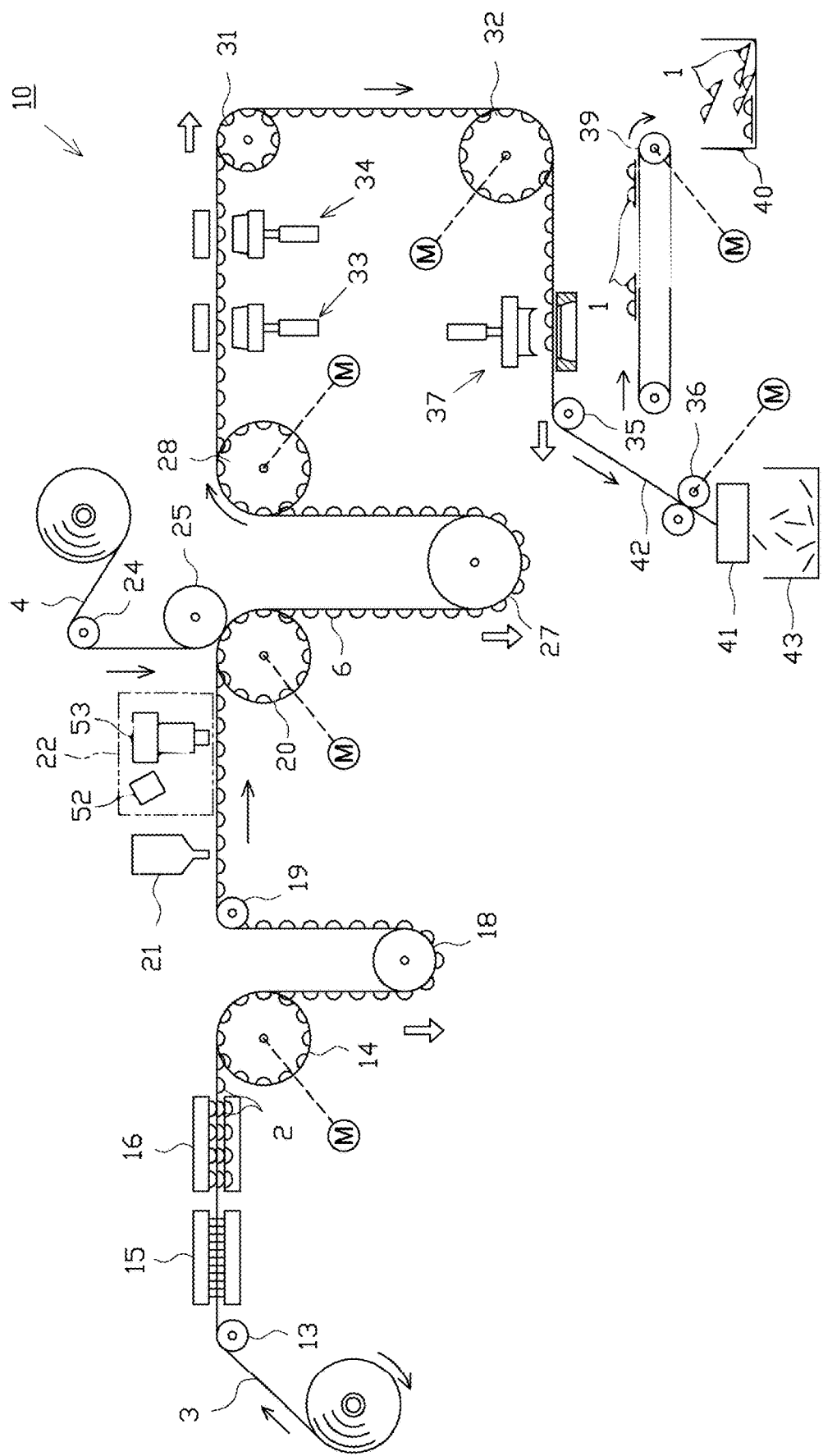
FIG. 3 is a schematic diagram illustrating the schematic configuration of a PTP packaging machine.

As shown in FIG. 3, a film roll of the belt-like container film 3 is wound in a roll form on a most upstream side of the PTP packaging machine 10. A pullout end of the container film 3 wound in the roll form is guided by a guide roll 13. The container film 3 is then laid on an intermittent feed roll 14 provided on a downstream side of the guide roll 13. The intermittent feed roll 14 is linked with a motor rotating in an intermittent manner, so as to convey the container film 3 intermittently.

A heating device 15 and a pocket portion forming device 16 are sequentially placed along the conveyance path of the container film 3 between the guide roll 13 and the intermittent feed roll 14. In the state that the container film 3 is heated to be relatively soft by the heating device 15, the plurality of pocket portions 2 are formed at predetermined positions of the container film 3 by the pocket portion forming device 16 (pocket portion forming process). The heating device 15 and the pocket portion forming device 16 are configured as the pocket portion forming unit according to one or more embodiments. Formation of the pocket portions 2 is performed during an interval between conveying operations of the container film 3 by the intermittent feed roll 14.

The container film 3 fed from the intermittent feed roll 14 is sequentially laid on a tension roll 18, a guide roll 19 and a film receiving roll 20 in this order. The film receiving roll 20 is linked with a motor rotating at a fixed speed, so as to continuously convey the container film 3 at a fixed speed. The tension roll 18 is configured to pull the container film 3 in a direction of applying tension by an elastic force. This configuration prevents a slack of the container film 3 due to a difference between the conveying operation by the intermittent feed roll 14 and the conveying operation by the film receiving roll 20 and constantly keeps the container film 3 in the state of tension.

A tablet filling device 21 and an inspection device 22 are sequentially placed along the conveyance path of the container film 3 between the guide roll 19 and the film receiving roll 20.

The tablet filling device 21 serves as the filling unit to automatically fill the pocket portions 2 with the tablets 5. The tablet filling device 21 opens a shutter at every predetermined time interval to drop the tablet 5, in synchronization with the conveying operation of the container film 3 by the film receiving roll 20. Each of the pocket portions 2 is filled with the tablet 5 by this shutter opening operation (filling process).

The inspection device 22 is a spectroscopic analyzer configured to perform an inspection by taking advantage of spectral analysis and more specifically to check for inclusion of any different type of object. The details of the inspection device 22 will be described later.

A film roll of the belt-like cover film 4 is also wound in a roll form on a most upstream side.

A pullout end of the cover film 4 wound in the roll form is guided via a guide roll 24 to a heating roll 25. The heating roll 25 is pressed against to be in contact with the film receiving roll 20 described above. The container film 3 and the cover film 4 are accordingly fed into between the two rolls 20 and 25.

The container film 3 and the cover film 4 pass through between the two rolls 20 and 25 in the heated and pressed contact state, so that the cover film 4 is mounted to the container film 3 such as to close the respective pocket portions 2 (mounting process). This series of operations manufactures the PTP film 6 as a blet-like body that has the pocket portions 2 respectively filled with the tablets 5. The heating roll 25 has minute protrusions formed on the surface of the heating roll 25 in a net-like pattern for sealing. Strongly pressing these protrusions against the films provides secure sealing. The film receiving roll 20 and the heating roll 25 are configured as the mounting unit according to one or more embodiments.

The PTP film 6 fed from the film receiving roll 20 is sequentially laid on a tension roll 27 and an intermittent feed roll 28 in this order. The intermittent feed roll 28 is linked with a motor rotating in an intermittent manner, so as to convey the PTP film 6 intermittently. The tension roll 27 is configured to pull the PTP film 6 in a direction of applying tension by an elastic force. This configuration prevents a slack of the PTP film 6 due to a difference between the conveying operation by the film receiving roll 20 and the conveying operation by the intermittent feed roll 28 and constantly keeps the PTP film 6 in the state of tension.

The PTP film 6 fed from the intermittent feed roll 28 is sequentially laid on a tension roll 31 and an intermittent feed roll 32 in this order. The intermittent feed roll 32 is linked with a motor rotating in an intermittent manner, so as to convey the PTP film 6 intermittently. The tension roll 31 is configured to pull the PTP film 6 in a direction of applying tension by an elastic force and thereby serves to prevent a slack of the PTP film 6 between these intermittent feed rolls 28 and 32.

A slit formation device 33 and a stamping device 34 are sequentially placed along the conveyance path of the PTP film 6 between the intermittent feed roll 28 and the tension roll 31. The slit formation device 33 serves to form a cutting slit at predetermined positions of the PTP film 6. The stamping device 34 serves to stamp a mark at predetermined positions of the PTP film 6 (for example, in tag portions).

The PTP film 6 fed from the intermittent feed roll 32 is sequentially laid on a tension roll 35 and a continuous feed roll 36 in this order on a downstream side of the intermittent feed roll 32. A sheet punching device 37 is placed along the conveyance path of the PTP film 6 between the intermittent feed roll 32 and the tension roll 35. The sheet punching device 37 serves as a sheet punching unit (separation unit) to punch out the outer periphery of each unit of PTP sheet 1 from the PTP film 6.

The respective PTP sheets 1 punched out by the sheet punching device 37 are conveyed by a conveyor 39 and are temporarily accumulated in a finished product hopper 40 (separation process). When a PTP sheet 1 is determined as a defective product by the inspection device 22 described above, however, this PTP sheet 1 determined as defective is not conveyed to the finished product hopper 40 but is separately discharged by a non-illustrated defective sheet discharge mechanism serving as the discharge unit.

A cutting device 41 is provided on a downstream side of the continuous feed roll 36. A non-required film portion 42 that is a residual part (scrap part) remaining in a belt-like form after punching out by the sheet punching device 37 is guided by the tension roll 35 and the continuous feed roll 36 and is subsequently led to the cutting device 41. A driven roll is pressed against to be in contact with the continuous feed roll 36, so that the non-required film portion 42 is placed and conveyed between the driven roll and the continuous feed roll 36. The cutting device 41 serves to cut the non-required film portion 42 into predetermined dimensions as scraps. These scraps are accumulated in a scrap hopper 43 and are then disposed separately.

Each of the rolls such as the rolls 14, 20, 28, 31 and 32 described above is arranged in a positional relationship that the roll surface is opposed to the pocket portions 2. The surface of each roll such as the surface of the intermittent feed roll 14, has recesses that are formed to place the pocket portions 2 therein. This configuration suppresses the pocket portions 2 from being crushed. The feeding operation with the pocket portions 2 placed in the respective recesses of each roll such as the intermittent feed roll 14 achieves the reliable intermittent feed and continuous feed.

An accumulation device, a transfer device, a packaging device and the like are sequentially placed on a downstream side of the PTP packaging machine 10, although not being illustrated. The loose PTP sheets 1 placed in the finished product hopper 40 described above are, for example, paired to form sets of two and are then stacked in each group of multiple sets by the accumulation device. A stacked assembly of a plurality of the PTP sheets 1 is bundled with a band by the transfer device, is transferred to the packaging device, and is packaged, for example, in the form of a pillow package, by the packaging device.

Figure 4:
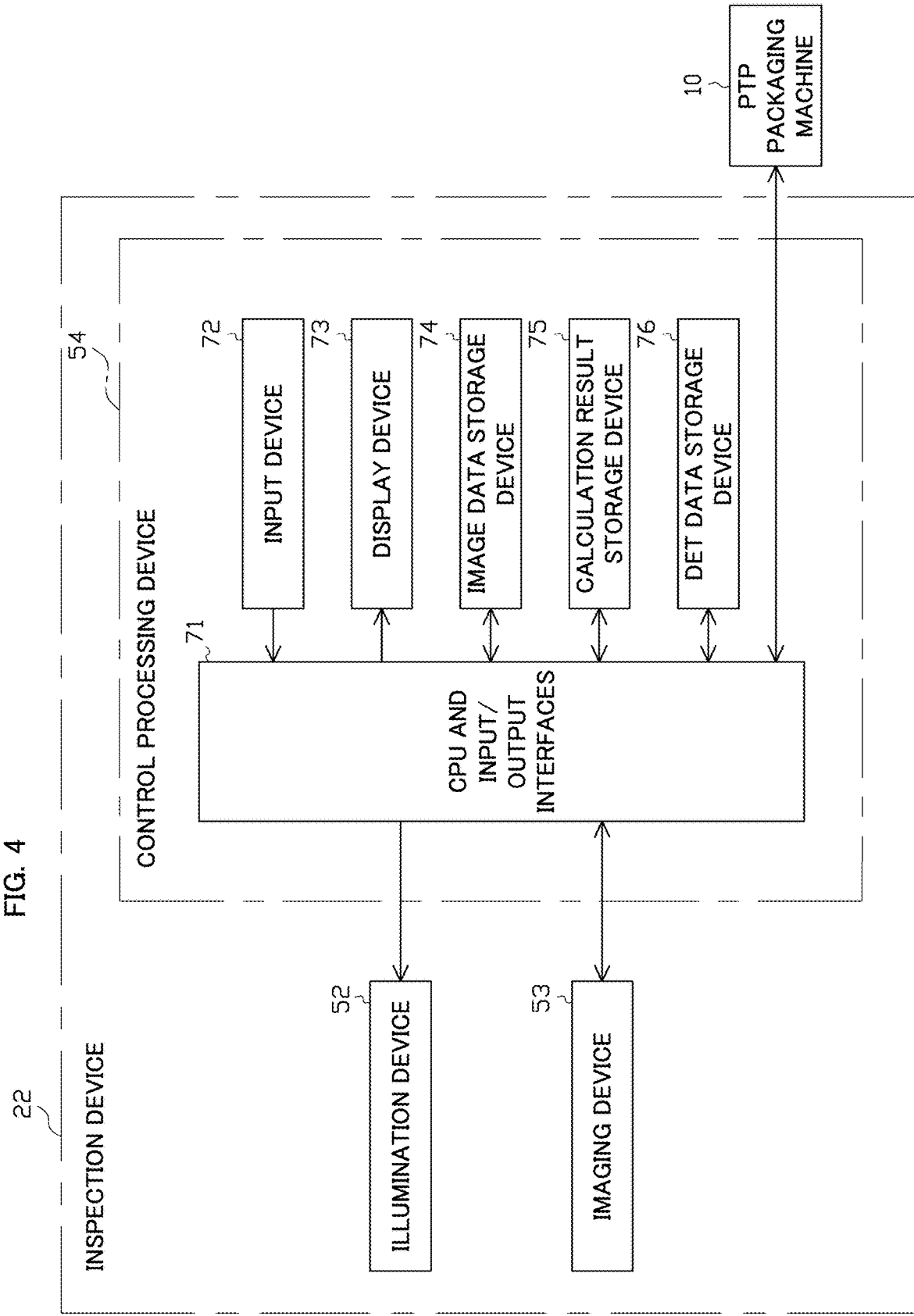
FIG. 4 is a block diagram illustrating the electrical configuration of an inspection device.
Figure 5:
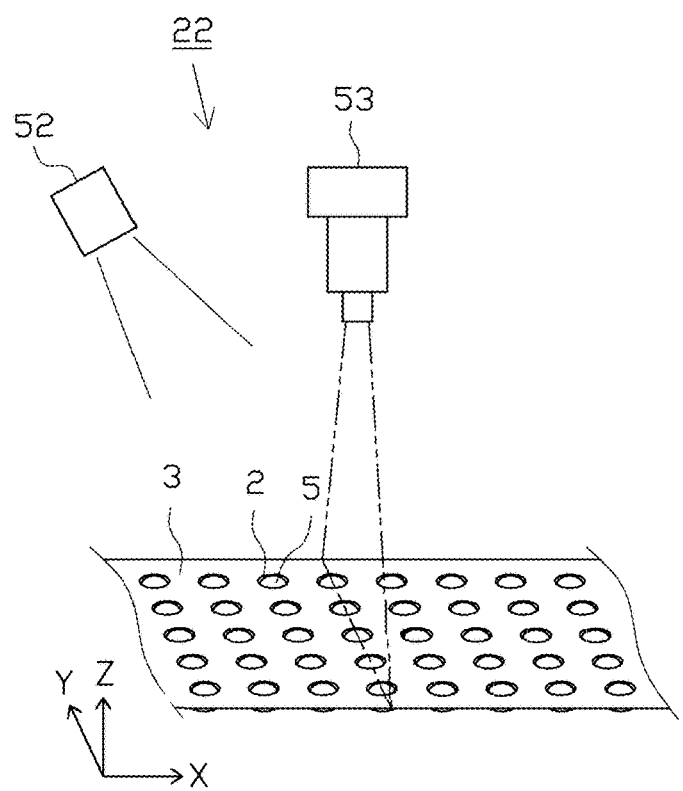
FIG. 5 is a perspective view schematically illustrating the arrangement configuration of the inspection device.

The foregoing describes the outline of the PTP packaging machine 10. The following describes the configuration of the above inspection device 22 in detail with reference to drawings. FIG. 4 is a block diagram illustrating the electrical configuration of the inspection device 22. FIG. 5 is a perspective view schematically illustrating the arrangement configuration of the inspection device 22.

As shown in FIG. 4 and FIG. 5, the inspection device 22 includes an illumination device 52, an imaging device 53, and a control processing device 54 (i.e., the processor) configured to perform various controls, for example, drive controls of the illumination device 52 and the imaging device 53, image processing, arithmetic operations and the like in the inspection device 22.

The illumination device 52 and the imaging device 53 are placed on an opening side of the pocket portions 2 of the container film 3. More specifically, according to one or more embodiments, an inspection for inclusion of any different type of object is performed from the opening side of the pocket portions 2 of the container film 3 in a stage prior to mounting of the cover film 4.

The illumination device 52 has a known configuration to radiate near-infrared light and is configured as the irradiation unit according to one or more embodiments. The illumination device 52 is arranged to irradiate a predetermined area on the continuously fed container film 3 obliquely downward with near-infrared light.

According to one or more embodiments, a halogen lamp is employed for the illumination device 52 as a light source configured to emit near-infrared light having a continuous spectrum (for example, a near-infrared range having a wavelength of 700 to 2500 nm). Other examples usable as the light source include a deuterium lamp, a tungsten lamp, and a xenon lamp.

Figure 6:
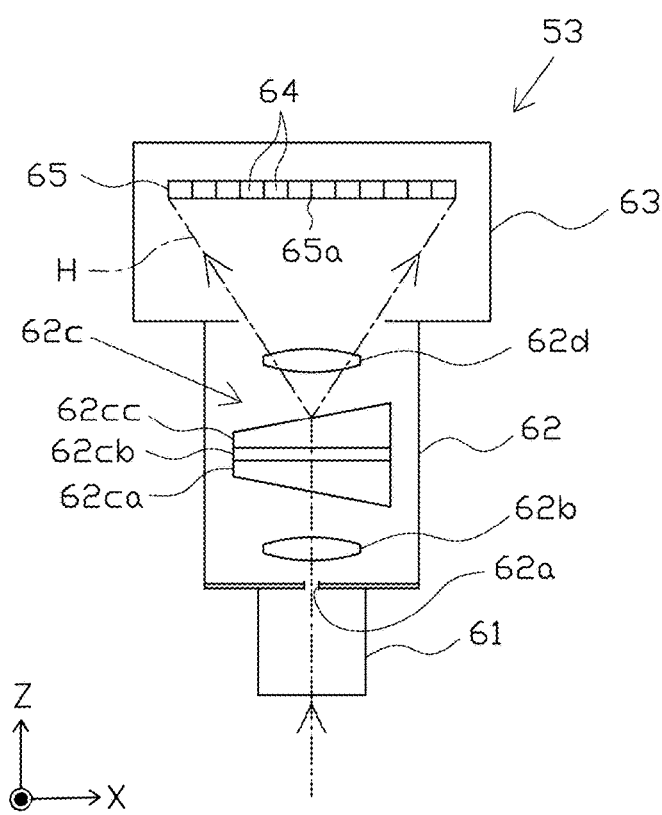
FIG. 6 is a schematic diagram illustrating the schematic configuration of an imaging device.

As shown in FIG. 6, the imaging device 53 includes an optical lens assembly 61, a two-dimensional spectroscope 62 serving as the spectral unit, and a camera 63 serving as an imaging unit (i.e., the imaging device).

The optical lens assembly 61 is comprised of a plurality of non-illustrated lenses and the like and is configured to convert incident light into parallel light. The optical lens assembly 61 has an optical axis that is set along a vertical direction (Z direction).

Furthermore, the optical lens assembly 61 is set to focus the incident light at the position of a slit 62a of the two-dimensional spectroscope 62 described later. As a matter of convenience, the following describes an example of employing a double-sided telecentric lens for the optical lens assembly 61. An image-sided telecentric lens may, however, also be employable for the optical lens assembly 61.

The two-dimensional spectroscope 62 is configured to include a slit 62a, an incident-side lens 62b, a spectral portion 62c and an emission-side lens 62d. The spectral portion 62c is configured to include an incident-side prism 62ca, a transmission type diffraction grating 62cb, and an emission-side prism 62cc.

Under the configuration described above, the light passing through the slit 62a is converted into parallel light by the incident-side lens 62b, is dispersed by the spectral portion 62c, and is focused by the emission-side lens 62d on an imaging element 65 of the camera 63 described later as a two-dimensional spectroscopic image (optical spectral image).

The slit 62a is formed to have a long approximately rectangular (linear) opening and is provided such that an opening width direction (short side direction) thereof is arranged along a film conveying direction of the container film 3 (X direction) and that a longitudinal direction thereof is arranged along a film width direction of the container film 3 (Y direction) orthogonal to the conveying direction. This configuration causes the two-dimensional spectroscope 62 to disperse the incident light in the opening width direction of the slit 62a, i.e., in the film conveying direction (X direction).

The camera 63 includes an imaging element 65 having a light receiving surface 65a where a plurality of light-receiving elements (light receivers) 64 are two-dimensionally arranged in a matrix arrangement. According to one or more embodiments, a known CCD area sensor having sufficient sensitivity to a wavelength range of, for example, 900 to 2300 nm, out of the near-infrared range, is employed as the imaging element 65.

The imaging element is, however, not necessarily limited to this example, but another sensor having sensitivity to the near-infrared range is also employable as the imaging element. For example, a CMOS sensor or an MCT (HgCdTe) sensor may be employed as the imaging element.

The imaging device 53 has a field of vision (imaging area) that is a linear region extended along the film width direction (Y direction) and that is an area including at least the entire range of the film width direction of the container film 3 (as shown by a two-dot chain line portion in FIG. 5). The field of vision of the imaging device 53 in the film conveying direction (X direction) is, on the other hand, an area corresponding to the width of the slit 62a. In other words, the field of vision is an area that causes an image of the light passing through the slit 62a (slit light) to be formed on the light receiving surface 65a of the imaging element 65.

This configuration causes each wavelength component (for example, every bandwidth of 10 nm to 20 nm) of the optical spectrum of the reflected light that is reflected at each position in the film width direction (Y direction) of the container film 3 to be received by each of the light-receiving elements 64 of the imaging element 65. A signal corresponding to the intensity of the light received by each of the light-receiving elements 64 is converted into a digital signal and is then output from the camera 63 to the control processing device 54. Accordingly, an image signal (spectroscopic image data) corresponding to one image plane that is imaged by the entire light receiving surface 65a of the imaging element 65 is output to the control processing device 54.

The control processing device 54 includes a CPU and input/output interfaces 71 (hereinafter referred to as "CPU and the like 71") that is configured to control the entire inspection device 22, an input device 72 that is configured as the "input unit" by, for example, a keyboard and a mouse or by a touch panel, a display device 73 that is configured as the "display unit" including a display screen such as a CRT screen or a liquid crystal screen, an image data storage device 74 that is configured to store various image data and the like, a calculation result storage device 75 that is configured to store results of various arithmetic operations and the like, and a set data storage device 76 that is configured to store various pieces of information in advance. These devices 72 to 76 are electrically connected with the CPU and the like 71.

The CPU and the like 71 is connected with the PTP packaging machine 10 such as to send and receive various signals to and from the PTP packaging machine 10. This configuration enables the CPU and the like 71 to control, for example, the defective sheet discharge mechanism of the PTP packaging machine 10.

The image data storage device 74 is configured to store, for example, spectroscopic image data taken by the imaging device 53, spectral image data obtained on the basis of the spectroscopic image data, and binarized image data after a binarization process.

The calculation result storage device 75 is configured to store, for example, inspection result data and statistical data obtained by statistically processing the inspection result data. These inspection result data and statistical data may be displayed appropriately on the display device 73.

The set data storage device 76 is configured to store, for example, loading vectors and a determination range used for principal component analysis, and the shapes and the dimensions of the PTP sheet 1, the pocket portion 2 and the tablet 5.

The following describes a procedure of different type inclusion inspection (inspection process) performed by the inspection device 22.

Figure 7:
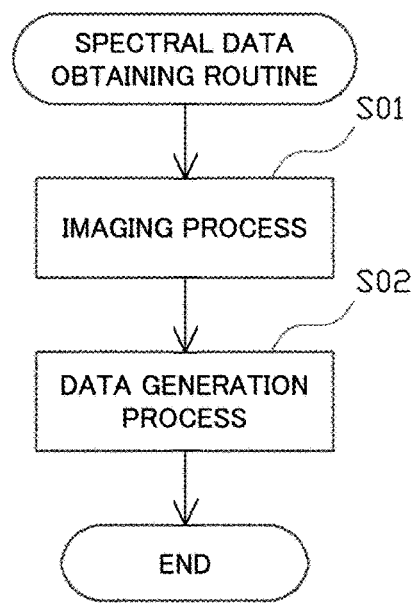
FIG. 7 is a flowchart showing a spectral data obtaining routine.

A spectral data obtaining routine performed to obtain spectral data is described first with reference to the flowchart of FIG. 7. This routine is a process performed repeatedly every time a predetermined amount of the container film 3 is conveyed.

At step S01, the control processing device 54 first causes the imaging device 53 to perform an imaging process (exposure process), while irradiating the continuously conveyed container film 3 (the tablet 5) with near-infrared light emitted from the illumination device 52 (irradiation process).

The control processing device 54 drives and controls the imaging device 53 in response to a signal input from a non-illustrated encoder provided in the PTP packaging machine 10, and stores spectroscopic image data taken by the imaging device 53 into the image data storage device 74.

Accordingly, reflected light that is reflected in a conveying direction imaging range W (shown in FIG. 10), out of the near-infrared light emitted from the illumination device 52 toward the container film 3, during an execution period of the imaging process of step S01 (exposure period) enters the imaging device 53. In other words, an image of the conveying direction imaging range W is taken by one imaging process.

Figure 10:
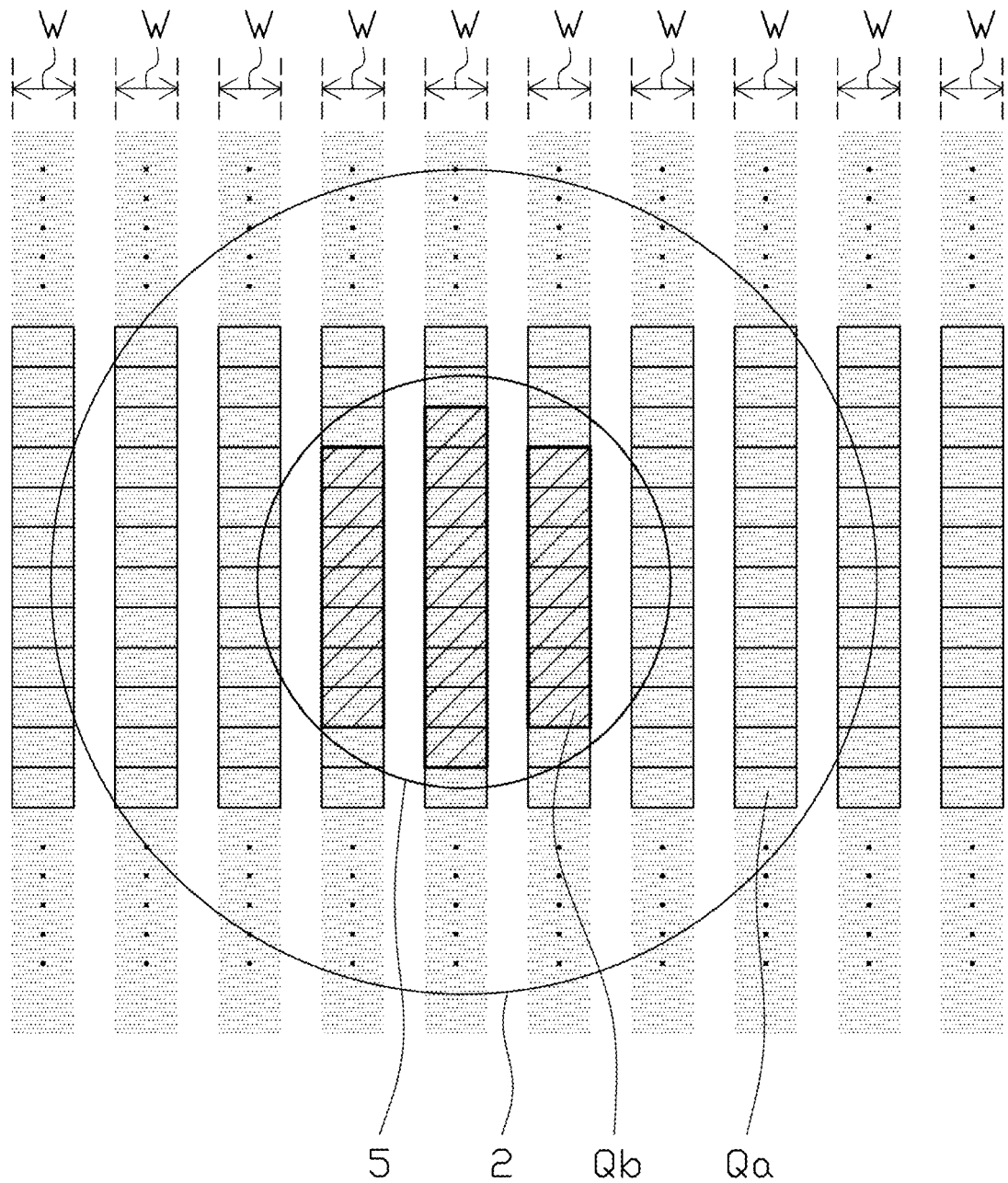
FIG. 10 is an explanatory diagram illustrating a relationship between a conveying direction imaging range and a spectral image.

As shown in FIG. 10, one or more embodiments are configured such that the imaging process described above is performed every time the container film 3 is conveyed by a predetermined amount. This configuration takes an image of the optical spectrum at a plurality of positions in the conveying direction with respect to one tablet 5.

The reflected light entering the imaging device 53 is dispersed by the two-dimensional spectroscope 62 (dispersion process) and is taken in the form of a spectroscopic image (optical spectrum) by the imaging element 65 of the camera 63 (imaging process).

Figure 8:
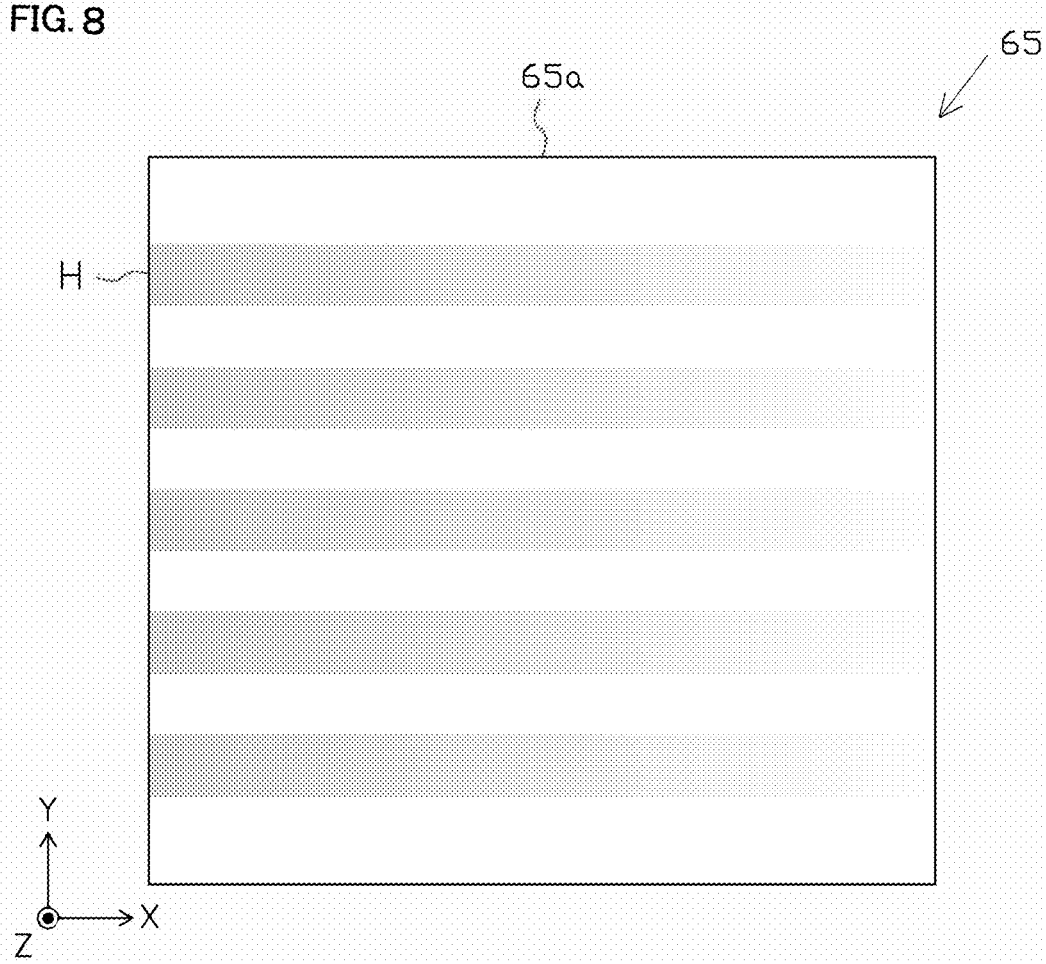
FIG. 8 is a schematic diagram illustrating an optical spectrum projected onto an imaging element.

FIG. 8 is a schematic diagram illustrating the state that an optical spectrum H of reflected light that is reflected at a predetermined position on the tablet 5 is projected onto the light receiving surface 65a of the imaging element 65. As a matter of convenience, FIG. 8 illustrates only the optical spectrum H with respect to the tablet 5, while omitting optical spectra with respect to the other locations.

The spectroscopic image (optical spectrum) data taken by the imaging device 53 is output to the control processing device 54 during an interval period and is stored into the image data storage device 74. The interval period herein denotes a reading period of image data. Accordingly, an imaging cycle of the imaging device 53 is expressed by a total time of the exposure period that is the execution period of the imaging process and the interval period.

After obtaining the spectroscopic image data, the control processing device 54 starts a data generation process at step S02.

The data generation process generates spectral data, based on the spectroscopic image data obtained at step S01. After generating the spectral data, the control processing device 54 stores the generated spectral data into the image data storage device 74 and then terminates this routine.

Figure 11:
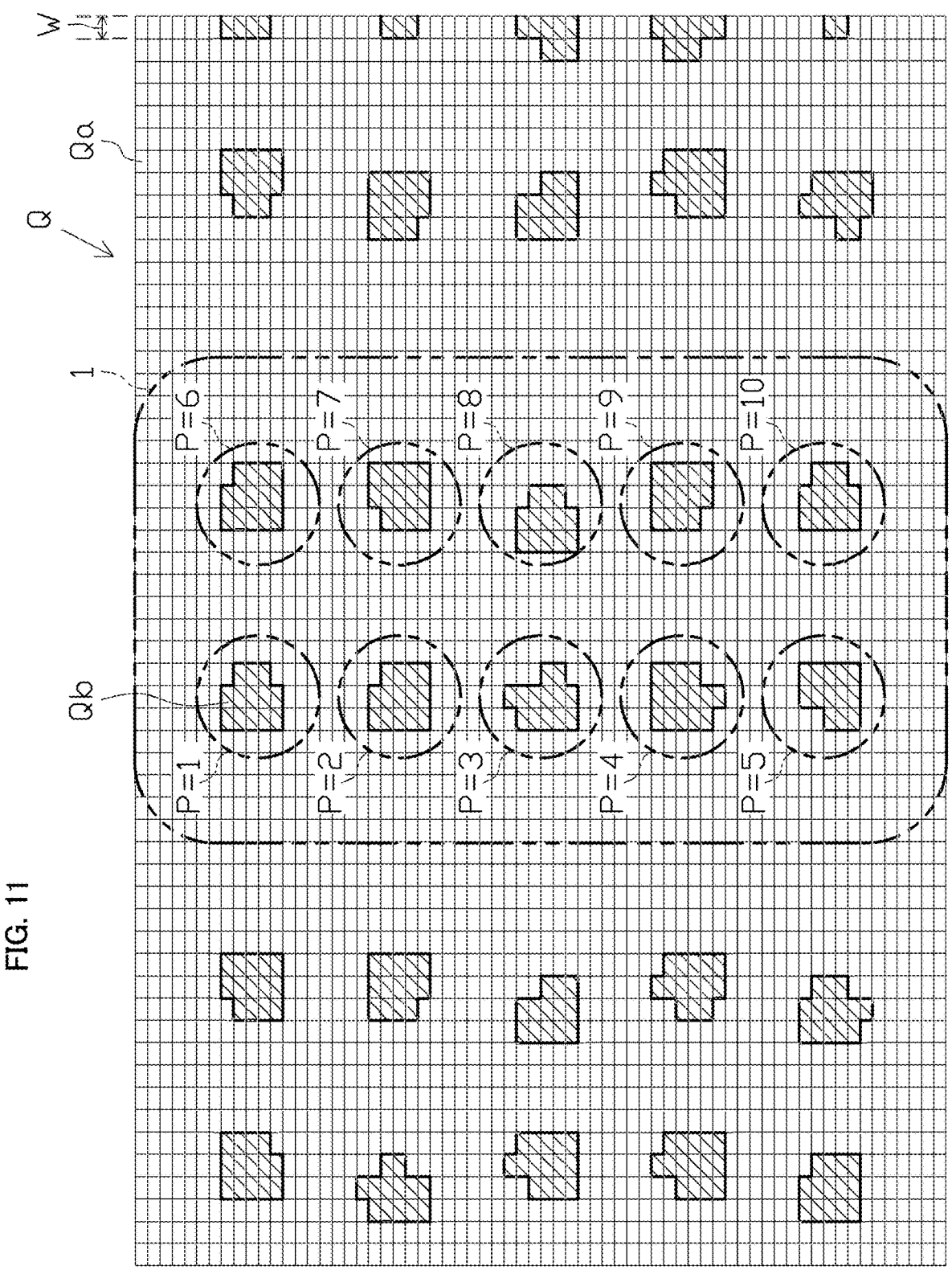
FIG. 11 is a schematic diagram illustrating a spectral image.

As shown in FIG. 10, every time the container film 3 (tablet 5) is conveyed by a predetermined amount, the conveying direction imaging range W is relatively moved intermittently and the spectral data obtaining routine described above is performed repeatedly. This causes spectral data corresponding to the respective conveying direction imaging ranges W to be successively stored in time series along with position information in the film conveying direction (X direction) and in the film width direction (Y direction), into the image data storage device 74. This series of operations generate a two-dimensional spectral image Q having spectral data with respect to each pixel (as shown in FIG. 11).

The following describes the spectral image Q according to one or more embodiments. As shown in FIG. 11, the spectral image Q is image data including a plurality of pixels Qa arrayed in a two-dimensional arrangement. Each of the pixels Qa includes spectral data (data indicating luminance values (spectral intensities) with regard to a plurality of wavelength components (wavelength bands)).

When obtaining the spectral image Q in a predetermined inspection range (shown by a two-dot chain line portion in FIG. 11) corresponding to one PTP sheet 1 as an object to be inspected, the control processing device 54 performs an inspection routine.

Figure 9:
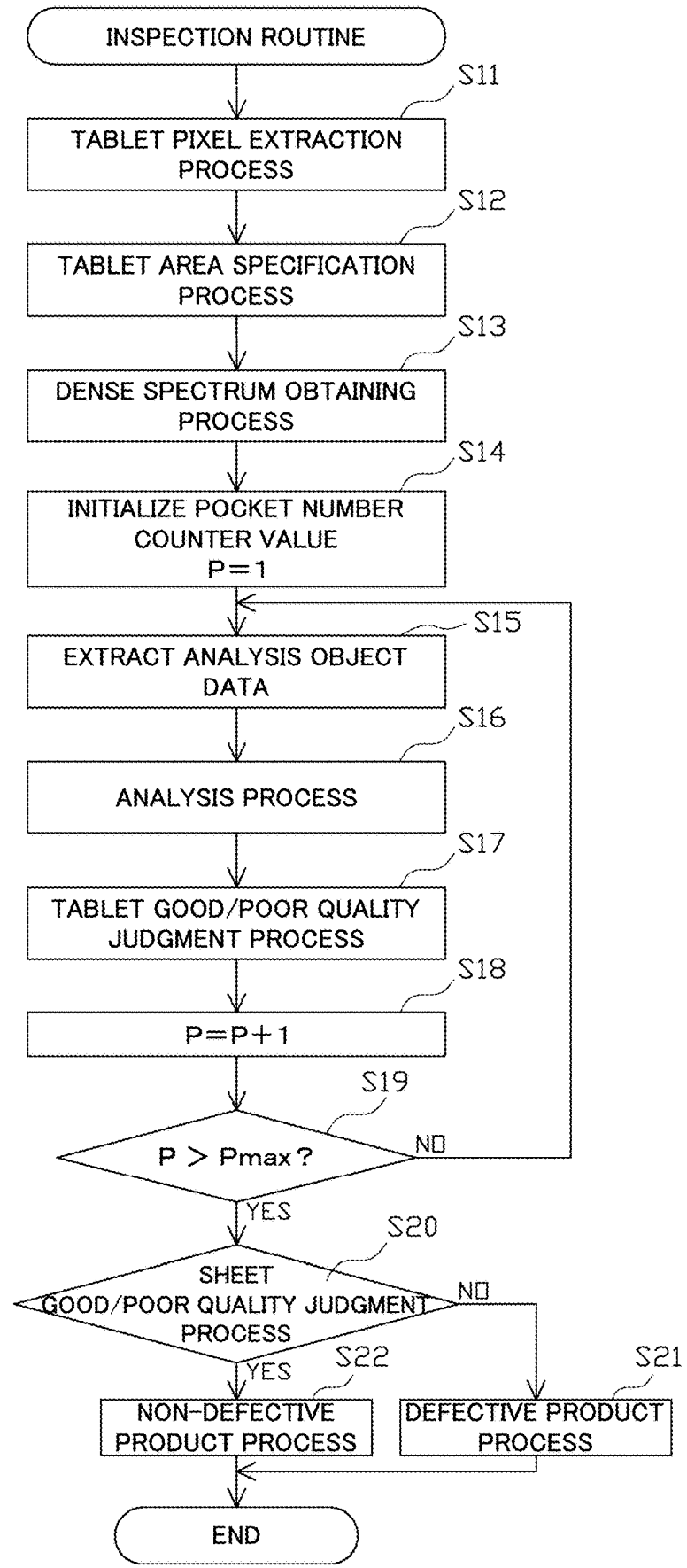
FIG. 9 is a flowchart showing an inspection routine.

The following describes the inspection routine with reference to the flowchart of FIG. 9. This routine is performed repeatedly every time the spectral image Q in the inspection range described above is obtained.

The control processing device 54 first performs a tablet pixel extraction process at step S11. In this process, the control processing device 54 extracts pixels Qb corresponding to the tablet 5 as an object to be analyzed (hereinafter referred to as "tablet pixels" Qb), among the respective pixels Qa of the spectral image Q.

According to one or more embodiments, for example, the control processing device 54 determines whether the luminance values at a predetermined wavelength in the spectral data of the respective pixels Qa are equal to or greater than a predetermined reference value and processes the spectral image Q by a binarization process. The control processing device 54 then extracts the tablet pixels Qb, based on the obtained binarized image data (as shown in FIG. 10 and FIG. 11).

According to one or more embodiments, as shown in FIG. 10, pixels Qa including data of imaging only the range of the tablet 5 without being affected by a background are extracted as tablet pixels Qb. FIG. 10 is an explanatory diagram illustrating a relationship between the conveying direction imaging range W and the spectral image Q. Pixels extracted as the tablet pixels Qb are shown as hatched areas in FIGS. 10 and 11.

The extraction procedure of the tablet pixels Qb is, however, not limited to this method, but another method may be employed. For example, another employable method may calculate an integrated value of spectral data (luminance values with regard to the respective wavelength components) with respect to each of the pixels Qa and determine whether the calculated integrated value is equal to or greater than a predetermined reference value, so as to extract the tablet pixels Qb.

The control processing device 54 subsequently performs a tablet area specification process at step S12. In this process, the control processing device 54 specifies areas of the ten tablets 5 placed in the respective pocket portions 2 in the inspection range.

According to one or more embodiments, for example, the control processing device 54 performs a labeling process with respect to the tablet pixels Qb obtained at step S11 described above and regards all adjacent tablet pixels Qb as a linkage component of the tablet pixels Qb belonging to one identical tablet 5.

This process specifies the range of one linkage component as a tablet area with respect to one tablet 5 placed in a predetermined pocket portion 2 (as shown in FIG. 10 and FIG. 11). In FIG. 10 and FIG. 11, a linkage component (tablet area) of a plurality of tablet pixels Qb belonging to each tablet 5 is encircled by a thick frame.

The spectral data of a plurality of tablet pixels Qb included in one linkage component (tablet area) can be treated as spectral data at a plurality of points (a plurality of coordinate positions) on one tablet 5.

Accordingly, a series of processes including the data generation process of step S02, the tablet pixel extraction process of step S11 and the tablet area specification process of step S12 configure the spectral data obtaining process according to one or more embodiments. The function of the control processing device 54 that performs these processes configures the spectral data obtaining module according to one or more embodiments.

The area specification procedure of the tablet 5 is, however, not limited to this method, but another method may be employed. For example, another employable method may determine pixels included in a predetermined range about a specific pixel at center, as pixels belonging to one identical tablet 5 with the specific pixel.

The control processing device 54 subsequently performs a dense spectrum obtaining process at step S13. This process uses spectral data of a plurality of tablet pixels Qb included in the tablet area of each tablet 5 specified at step S12 as described above to obtain a dense spectral data group with respect to the tablet 5 and also obtain an average value of the dense spectral data group.

Figure 12:
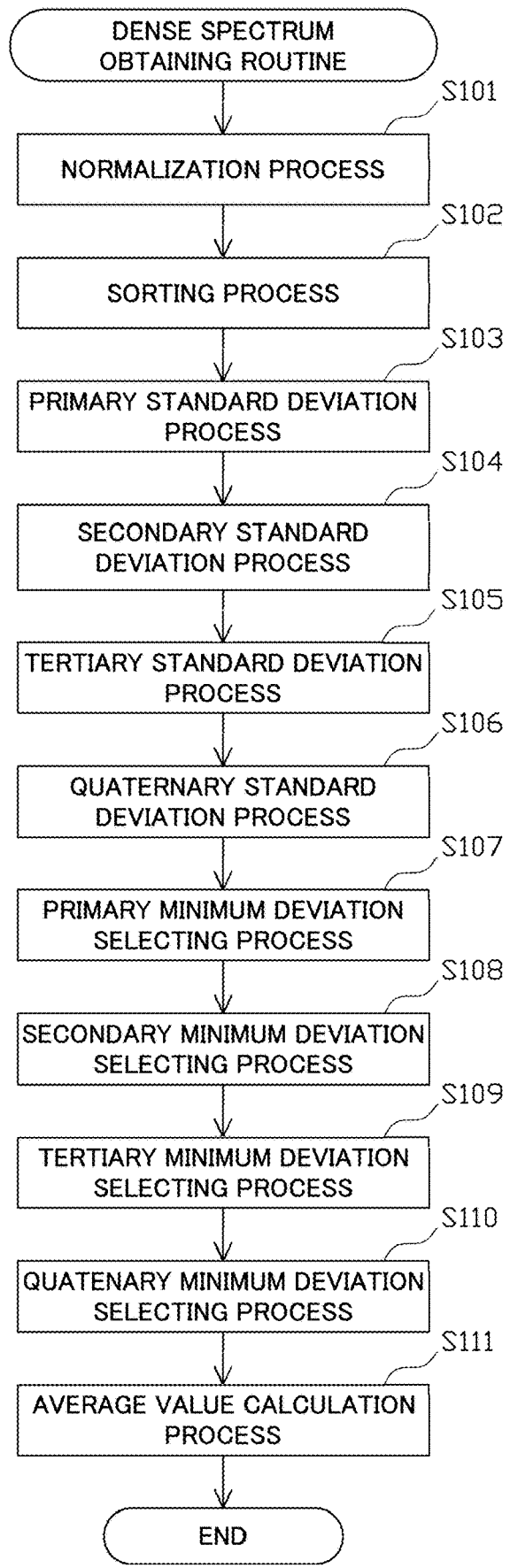
FIG. 12 is a flowchart showing a dense spectrum obtaining routine.

The following describes a dense spectrum obtaining routine performed to obtain a dense spectral data group with respect to one tablet 5, with reference to the flowchart of FIG. 12.

In the dense spectrum obtaining process of step S13, this routine is performed with respect to all the ten tablets 5 included in the inspection range. This process corresponds to the dense spectral data group selecting process according to one or more embodiments. The function of the control processing device 54 that performs this process configures the dense spectral data group selecting module according to one or more embodiments.

As shown in FIG. 12, in this routine, the control processing device 54 first performs a normalization process at step S101. This process corresponds to the normalization process according to one or more embodiments. The function of the control processing device 54 that performs this process configures the normalization module according to one or more embodiments.

In this process, the control processing device 54 normalizes the luminance value of each wavelength component in the spectral data of the plurality of tablet pixels Qb included in the tablet area of the tablet 5 specified at step S12 described above (as shown in FIG. 13 and FIG. 14).

The procedure of one or more embodiments normalizes the luminance value of each wavelength component in the spectral data by dividing this luminance value by an average value of the luminance values of the respective wavelength components. The procedure of the normalization is, however, not limited to the above, but another method may be employed.

Figure 13:
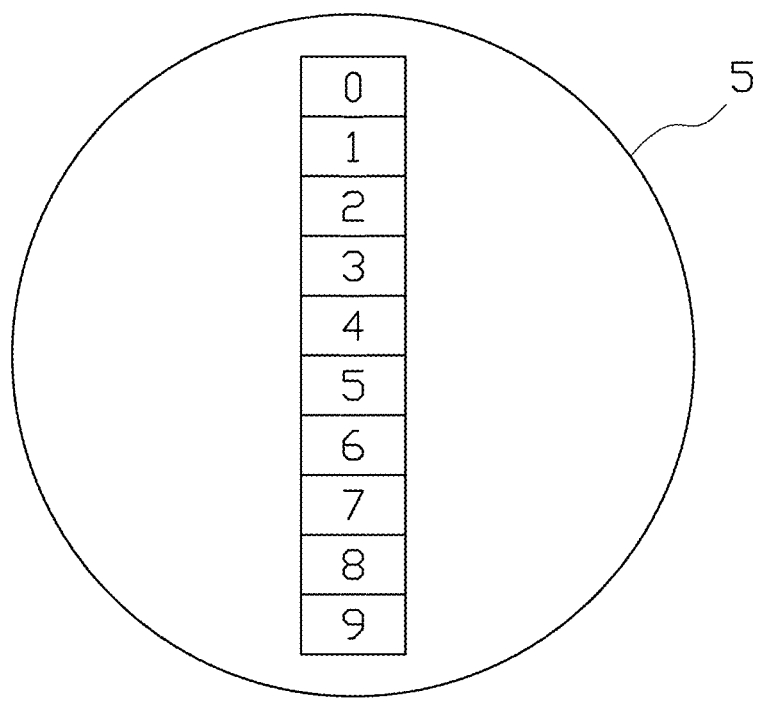
FIG. 13 is a schematic diagram illustrating one example of a plurality of coordinate points on a tablet where spectral data are obtained.

FIG. 13 is a schematic diagram illustrating one example of a plurality of coordinate points (pixel [0] to pixel [9]) on one tablet 5 where spectral data are obtained. FIG. 14 is a table showing one example of spectral data obtained at these coordinate points.

FIG. 14 illustrates only normalized values of luminance data with respect to part of a predetermined number of wavelength components (a total of 96 bands according to one or more embodiments) included in spectral data at the respective coordinate points.

"Band No." in FIG. 14 indicates a band number i ($1 \leq i \leq 96$, where i denotes a natural number) that is a serial number assigned to each of the predetermined number of wavelength components included in the spectral data. According to one or more embodiments, a bandwidth of 10 nm is assigned to a wavelength component corresponding to one band number i. For example, a wavelength band of 1300 nm (a bandwidth of 10 nm around a wavelength of 1300 nm as the center) is assigned to the band number [1], and a wavelength band of 2250 nm (a bandwidth of 10 nm around a wavelength of 2250 nm as the center) is assigned to the band number [96].

After termination of the normalization process of step S101 described above, the control processing device 54 performs a sorting process (rearranging process) at step S102. This process corresponds to the sorting process according to one or more embodiments. The function of the control processing device 54 that performs this process configures the sorting module according to one or more embodiments.

In this process, the control processing device 54 extracts luminance data of a plurality of tablet pixels Qb with respect to a predetermined wavelength component reflecting the characteristic of the tablet 5 from the luminance data normalized at step S101 and sorts the extracted luminance data in a predetermined ascending order or descending order (ascending sequence or descending sequence).

Figure 15:
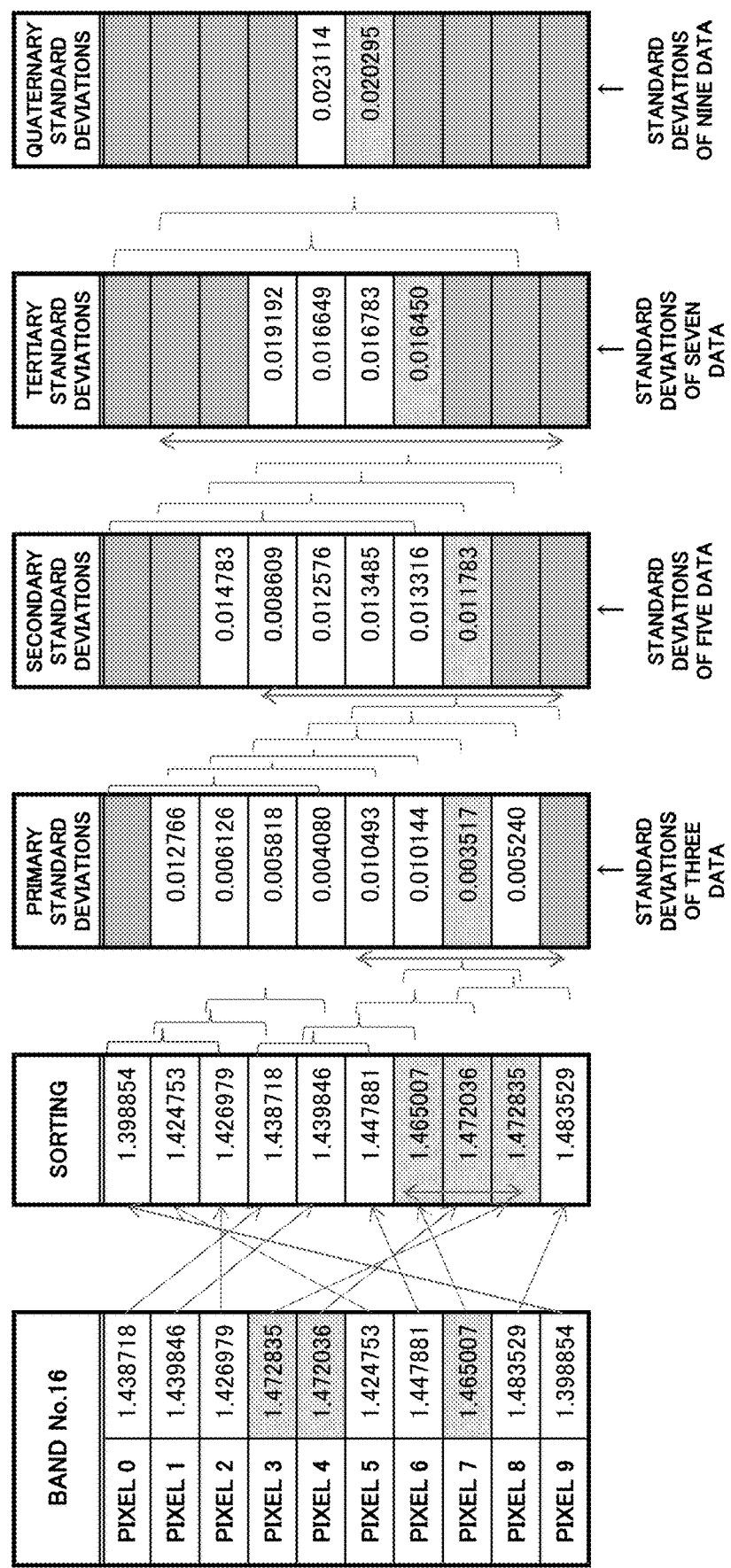
FIG. 15 is an explanatory diagram schematically illustrating the processing flow of the dense spectrum obtaining routine.

In the illustrated example of FIG. 14, the control processing device 54 extracts luminance data of a plurality of pixels [0] to [9] with respect to a wavelength component of a band number "16" (wavelength band of 1450 nm) and sorts the extracted luminance data (as shown in FIG. 15). FIG. 15 is an explanatory diagram schematically illustrating the processing flow of the dense spectrum obtaining routine performed on the basis of the data shown in FIG. 14.

The control processing device 54 subsequently performs a primary standard deviation process at step S103. This process calculates a standard deviation of each data group comprised of three consecutive luminance data in a data array of luminance data sorted in the predetermined order by the sorting process at step S102 described above (hereinafter referred to as "sorted data array") (as shown in FIG. 15). The standard deviation data calculated as described above is appropriately stored into the calculation result storage device 75 (the same applies to standard deviation data calculated subsequently).

For example, in the illustrated example of FIG. 15, the control processing device 54 calculates a standard deviation "0.012766" of a data group comprised of three luminance data, i.e., first data from the top "1.398854", second data "1.424753" and third data "1.426979" in a sorted data array of ten luminance data (shown as first standard deviation data from the top in a data array of primary standard deviation in FIG. 15).

Similarly, the control processing device 54 calculates a standard deviation "0.006126" of a data group comprised of three luminance data, i.e., the second data "1.424753" from the top, the third data "1.426979" and fourth data "1.438718" in the sorted data array (shown as second standard deviation data from the top in the data array of primary standard deviation in FIG. 15).

In the illustrated example of FIG. 15, eight primary standard deviation data (standard deviations of eight data groups respectively comprised of three consecutive luminance data) are calculated in this manner.

The control processing device 54 subsequently performs a secondary standard deviation process at step S104. This process calculates a standard deviation of each data group comprised of five consecutive luminance data in the sorted data array obtained at step S102 described above (as shown in FIG. 15).

For example, in the illustrated example of FIG. 15, the control processing device 54 calculates a standard deviation "0.014783" of a data group comprised of five luminance data, i.e., the first data from the top "1.398854", the second data "1.424753", the third data "1.426979", the fourth data "1.438718" and fifth data "1.439846" in the sorted data array of the ten luminance data (shown as first standard deviation data from the top in a data array of secondary standard deviation in FIG. 15).

Similarly, the control processing device 54 calculates a standard deviation "0.008609" of a data group comprised of five luminance data, i.e., the second data from the top "1.424753", the third data "1.426979", the fourth data "1.438718", fifth data "1.439846" and sixth data "1.447881" in the sorted data array of the ten luminance data (shown as second standard deviation data from the top in the data array of secondary standard deviation in FIG. 15).

In the illustrated example of FIG. 15, six secondary standard deviation data (standard deviations of six data groups respectively comprised of five consecutive luminance data) are calculated in this manner.

The control processing device 54 subsequently performs a tertiary standard deviation process at step S105. This process calculates a standard deviation of each data group comprised of seven consecutive luminance data in the sorted data array obtained at step S102 described above (as shown in FIG. 15).

For example, in the illustrated example of FIG. 15, the control processing device 54 calculates a standard deviation "0.019192" of a data group comprised of seven luminance data, i.e., the first data from the top "1.398854", the second data "1.424753", the third data "1.426979", the fourth data "1.438718", the fifth data "1.439846", the sixth data "1.447881" and seventh data "1.465007" in the sorted data array of the ten luminance data (shown as first standard deviation data from the top in a data array of tertiary standard deviation in FIG. 15).

Similarly, the control processing device 54 calculates a standard deviation "0.016649" of a data group comprised of seven luminance data, i.e., the second data from the top "1.424753", the third data "1.426979", the fourth data "1.438718", the fifth data "1.439846", the sixth data "1.447881", the seventh data "1.465007" and eighth data "1.472036" in the sorted data array of the ten luminance data (shown as second standard deviation data from the top in the data array of tertiary standard deviation in FIG. 15).

In the illustrated example of FIG. 15, four tertiary standard deviation data (standard deviations of four data groups respectively comprised of seven consecutive luminance data) are calculated in this manner.

The control processing device 54 subsequently performs a quaternary standard deviation process at step S106. This process calculates a standard deviation of each data group comprised of nine consecutive luminance data in the sorted data array obtained at step S102 described above (as shown in FIG. 15).

For example, in the illustrated example of FIG. 15, the control processing device 54 calculates a standard deviation "0.023114" of a data group comprised of nine luminance data, i.e., the first data from the top "1.398854", the second data "1.424753", the third data "1.426979", the fourth data "1.438718", the fifth data "1.439846", the sixth data "1.447881", the seventh data "1.465007", the eighth data "1.472036" and ninth data "1.472835" in the sorted data array of the ten luminance data (shown as first standard deviation data from the top in a data array of quaternary standard deviation in FIG. 15).

Similarly, the control processing device 54 calculates a standard deviation "0.020295" of a data group comprised of nine luminance data, i.e., the second data from the top "1.424753", the third data "1.426979", the fourth data "1.438718", the fifth data "1.439846", the sixth data "1.447881", the seventh data "1.465007", the eighth data "1.472036", the ninth data "1.472835" and tenth data "1.483529" in the sorted data array of the ten luminance data (shown as second standard deviation data from the top in the data array of quaternary standard deviation in FIG. 15).

In the illustrated example of FIG. 15, two quaternary standard deviation data (standard deviations of two data groups respectively comprised of nine consecutive luminance data) are calculated in this manner.

The control processing device 54 subsequently performs a primary minimum deviation selecting process at step S107. This process selects minimum quaternary standard deviation data out of the quaternary standard deviation data obtained by the quaternary standard deviation process at step S106 described above.

This process then leaves nine luminance data that is the basis of calculation of the above selected data (selected minimum quaternary standard deviation data), as valid data in the sorted data array obtained at step S102 described above, while simulatively excluding the remaining other luminance data as invalid data from the sorted data array.

For example, in the illustrated example of FIG. 15, the control processing device 54 selects the second data "0.020295" from the top, since this data is the minimum, out of the two standard deviation data in the data array of quaternary standard deviation data. In FIG. 15, cells of selected data are filled with a dotted pattern for the purpose of the easier recognition of the selected data (the same applies to subsequent selected data).

In the illustrated example of FIG. 15, the control processing device 54 then simulatively excludes the first luminance data from the top, as invalid data from the sorted data array, while leaving the nine luminance data, i.e., the second luminance data to the tenth luminance data, as valid data.

The control processing device 54 subsequently performs a secondary minimum deviation selecting process at step S108. This process selects minimum tertiary standard deviation data out of tertiary standard deviation data calculated on the basis of the valid data (nine luminance data) left in the sorted data array at step S107 described above, among the tertiary standard deviation data obtained by the tertiary standard deviation process at step S105 described above.

This process then leaves seven luminance data that is the basis of calculation of the above selected data (selected minimum tertiary standard deviation data), as valid data in the above sorted data array, while simulatively excluding the remaining other luminance data as invalid data from the sorted data array.

For example, in the illustrated example of FIG. 15, the control processing device 54 selects the minimum tertiary standard deviation data out of three tertiary standard deviation data, i.e., the second data to the fourth data from the top, since these three tertiary standard deviation data are tertiary standard deviation data calculated on the basis of the valid data (nine luminance data) left at step S107 described above, among the four tertiary standard deviation data in the data array of tertiary standard deviation. More specifically, the control processing device 54 here selects the fourth data "0.016450" from the top, since this data is the minimum.

In the illustrated example of FIG. 15, the control processing device 54 then simulatively excludes the three luminance data, i.e., from the first data to the third data from the top, as invalid data from the sorted data array, while leaving the seven luminance data, i.e., from the fourth data to the tenth data from the top, as valid data.

The control processing device 54 subsequently performs a tertiary minimum deviation selecting process at step S109. This process selects minimum secondary standard deviation data out of secondary standard deviation data calculated on the basis of the valid data (seven luminance data) left in the sorted data array at step S108 described above, among the secondary standard deviation data obtained by the secondary standard deviation process at step S104 described above.

This process then leaves five luminance data that is the basis of calculation of the above selected data (selected minimum secondary standard deviation data), as valid data in the above sorted data array, while simulatively excluding the remaining other luminance data as invalid data from the sorted data array.

For example, in the illustrated example of FIG. 15, the control processing device 54 selects the minimum secondary standard deviation data out of three secondary standard deviation data, i.e., the fourth data to the sixth data from the top, since these three secondary standard deviation data are secondary standard deviation data calculated on the basis of the valid data (seven luminance data) left at step S108 described above, among the six secondary standard deviation data in the data array of secondary standard deviation. More specifically, the control processing device 54 here selects the sixth data "0.011783" from the top, since this data is the minimum.

In the illustrated example of FIG. 15, the control processing device 54 then simulatively excludes the five luminance data, i.e., from the first data to the fifth data from the top, as invalid data from the sorted data array, while leaving the five luminance data, i.e., from the sixth data to the tenth data from the top, as valid data.

The control processing device 54 subsequently performs a quaternary minimum deviation selecting process at step S110. This process selects minimum primary standard deviation data out of primary standard deviation data calculated on the basis of the valid data (five luminance data) left in the sorted data array at step S109 described above, among the primary standard deviation data obtained by the primary standard deviation process at step S103 described above.

This process subsequently leaves three luminance data that is the basis of calculation of the above selected data (selected minimum primary standard deviation data), as valid data in the above sorted data array, while simulatively excluding the remaining other luminance data as invalid data from the sorted data array.

This process then stores a group of spectral data with respect to three coordinate points (pixels), which the three luminance data selected as described above respectively belong to, as a dense spectral data group into the calculation result storage device 75.

For example, in the illustrated example of FIG. 15, the control processing device 54 selects the minimum primary standard deviation data out of three primary standard deviation data, i.e., the sixth data to the eighth data from the top, since these three primary standard deviation data are primary standard deviation data calculated on the basis of the valid data (five luminance data) left at step S109 described above, among the eight primary standard deviation data in the data array of primary standard deviation. More specifically, the control processing device 54 here selects the seventh data "0.003517" from the top, since this data is the minimum.

In the illustrated example of FIG. 15, the control processing device 54 subsequently leaves the three luminance data, i.e., from the seventh data to the ninth data from the top, as valid data in the sorted data array, while simulatively excluding the remaining other seven luminance data as invalid data.

In the illustrated example of FIG. 15, a group of spectral data with respect to three coordinate points, i.e., the pixel "3", the pixel "4", and the pixel "7", is stored as a dense spectral data group into the calculation result storage device 75.

The control processing device 54 subsequently performs an average value calculation process at step S111. This process first calculates an average value of luminance values with regard to each wavelength component in the spectral data with respect to the three coordinate points constituting the dense spectral data group described above. The control processing device 54 then stores spectral data including average luminance values of the respective wavelength components, as average spectral data with respect to the tablet 5 (hereinafter referred to as "dense average spectral data"), into the calculation result storage device 75.

After obtaining the dense average spectral data with regard to each of the ten tablets 5 placed in the respective pocket portions 2 in the inspection range, the control processing device 54 collectively stores the obtained dense average spectral data as an inspection range data group with regard to one inspection range into the calculation result storage device 75.

Referring back to the description of the inspection routine of FIG. 9, at subsequent step S14, the control processing device 54 sets a counter value P of a pocket number counter provided in the calculation result storage device 75 to an initial value "1".

The "pocket number" denotes a serial number set corresponding to each of the ten pocket portions 2 included in one inspection range. The position of each pocket portion 2 can be specified by the counter value P of the pocket number counter (hereinafter simply referred to as "pocket number counter value P") (as shown in FIG. 11).

In the illustrated example of FIG. 11, for example, an uppermost pocket portion 2 in a left column is set as the pocket portion 2 corresponding to a pocket number counter value [1]. A lowermost pocket portion 2 in a right column is set as the pocket portion 2 corresponding to a pocket number counter value [10].

The control processing device 54 subsequently performs an analysis object data extraction process at step S15. In this process, the control processing device 54 extracts dense average spectral data of the tablet 5 placed in a pocket portion 2 corresponding to a current pocket number counter value P (for example, P=1), from the inspection range data group with respect to one inspection range (dense average spectral data of the ten tablets 5) obtained at step S13 described above.

The control processing device 54 subsequently performs an analysis process for the dense average spectral data of the tablet 5 extracted at step S15 (step S16). This process corresponds to the analyzing process according to one or more embodiments. The function of the control processing device 54 that performs this process configures the analyzing module according to one or more embodiments.

According to one or more embodiments, for example, the control processing device 54 uses a loading vector obtained in advance and performs principal component analysis (PCA) for the dense average spectral data of the tablet 5 obtained at step S13 described above. More specifically, the control processing device 54 calculates a principal component point by arithmetic operation of the above loading vector and the dense average spectral data of the tablet 5.

The control processing device 54 subsequently performs a tablet good/poor quality judgment process at step S17. In this process, the control processing device 54 determines whether the tablet 5 placed in the pocket portion 2 corresponding to the current pocket number counter value P (for example, P=1) is a non-defective product (identical type of object) or a defective product (different type of object), based on the result of analysis obtained by the analysis process performed at step S16 as described above.

More specifically, the control processing device 54 plots the principal component point calculated at step S16 described above in a PCA chart and determines the tablet 5 as a non-defective product (identical type of object) when the plotted data is within a non-defective range set in advance, while determining the tablet 5 as a defective product (different type of object) when the plotted data is out of the non-defective range.

The control processing device 54 then stores the result of determination with respect to the tablet 5 ("non-defective" or "defective") into the calculation result storage device 75.

The control processing device 54 subsequently adds "1" to the current pocket number counter value P at step S18 and proceeds to step S19 to determine whether the newly set pocket number counter value P exceeds a maximum value Pmax. The maximum value Pmax denotes a maximum value of the number of pocket portions 2 included in one inspection range ("10" according to one or more embodiments).

In the case of negative determination, the control processing device 54 goes back to step S15 to perform the series of processing described above again. In the case of affirmative determination, on the other hand, the control processing device 54 determines that the good/poor quality judgment of the tablets 5 has been completed with respect to all the pocket portions 2 and proceeds to step S20.

At subsequent step S20, the control processing device 54 performs a sheet good/poor quality judgment process. In this process, the control processing device 54 determines whether the PTP sheet 1 corresponding to the inspection range is a non-defective product or a defective product, based on the results of determination in the tablet good/poor quality judgment process performed at step S17 described above.

More specifically, when there is any tablet 5 determined as "defective" in the inspection range, the control processing device 54 determines the PTP sheet 1 corresponding to the inspection range as a "defective product" and proceeds to step S21.

When there is no tablet 5 determined as "defective" in the inspection range, on the other hand, the control processing device 54 determines the PTP sheet 1 corresponding to the inspection range as a "non-defective product" and proceeds to step S22.

The control processing device 54 performs a defective product process at step S21 to store the result of determination as the "defective product" with respect to the PTP sheet 1 into the calculation result storage device 75, outputs this determination result to the defective sheet discharge mechanism or the like of the PTP packaging machine 10, and then terminates the inspection routine.

The control processing device 54, on the other hand, performs a non-defective product process at step S22 to store the result of determination as the "non-defective product" with regard to the PTP sheet 1 (inspection range) into the calculation result storage device 75, and then terminates the inspection routine.

As described above in detail, the configuration of one or more embodiments selects a group having a highest density of luminance values with regard to a predetermined wavelength component (a wavelength component reflecting the characteristic of the tablet 5) (dense spectral data group) among spectral data at a plurality of coordinate points on one tablet 5. Even when there is a variation in data at the plurality of coordinate points on one tablet 5, this configuration excludes spectral data with respect to singular points on the tablet 5 (spectral data that seems not to appropriately reflect the characteristic of the tablet 5) and obtains average spectral data (dense average spectral data) with respect to the tablet 5.

For example, when there is any mass area of a diluting agent on the tablet 5 or when the tablet 5 has the score line 5F or the tapered portion 5D, this configuration enables more appropriate spectral data suitable for spectral analysis of the tablet 5 to be obtained, while avoiding, for example, the effects of the diluting agent, the effects of the shadow portions arising in the score line 5F and the like, and the effects of the shine occurring in the corner portion and the like.

As a result, this configuration significantly enhances the inspection accuracy in the different type inclusion inspection, compared with, for example, a configuration that simply averages spectral data at a plurality of points on the tablet 5.

The present invention is not limited to the description of the above embodiments but may be implemented, for example, by configurations described below. The present invention may also be naturally implemented by applications and modifications other than those illustrated below.

(a) The embodiments described above illustrates the case where the object is the tablet 5. The type or the like of the object is, however, not specifically limited. The object may be, for example, a capsule, a supplement, or a food item. The tablet includes a solid preparation such as an uncoated plain tablet and a sugar-coated tablet.

In the case where the object of inspection is a capsule, specularly reflected light that is reflected from a capsule body makes shine and affects an inspection for a medicinal substance placed inside of the capsule body. The configuration of one or more embodiments of the present invention, however, reduces the possibility of such an issue.

Moreover, the shape and the like of the object are not limited to the description of the above embodiments. The above embodiments illustrate the tablet 5 that is the disk-shaped plain tablet having the circular shape in plan view and that has the tapered portions 5D and 5E formed in the outer peripheries of both the surface 5B and the rear face 5C and the score line 5F marked in the surface 5B.

The object is, however, not limited to the above but may be a tablet with omission of the tapered portions 5D and 5E and/or the score line 5F. The object may also be a tablet with a recess marked.

Furthermore, the object may be, for example, a lens-shaped tablet that is formed in a circular shape in plan view and that has different thicknesses in a central part and in a peripheral part or may be a tablet having a substantially elliptical shape, a substantially oval shape, a substantially polygonal shape or the like in plan view.

(b) The materials of the container film 3 and the cover film 4 are not limited to those of the embodiments described above, but other materials may be employed. For example, the container film 3 may be made of a metal material that contains aluminum as a main material, such as an aluminum laminated film.

(c) The arrangement and the number of the pocket portions 2 in the PTP sheet 1 are not limited at all to those described in the above embodiments. A PTP sheet may be configured to have any of various other arrangements of and any number of pocket portions, for example, a total of twelve pocket portions arrayed in three lines.

(d) The above embodiments are configured to irradiate the tablets 5 and take the images of the tablets 5 from the opening side of the pocket portions 2 and perform the different type inclusion inspection by the inspection device 22 in a post process after the pocket portions 2 are filled with the tablets 5 and a previous process before the cover film 4 is mounted to the container film 3.

This configuration is, however, not essential. When the container film 3 is made of a transparent material, a modification may be configured to irradiate the tablets 5 and take the images of the tablets 5 across the pocket portions 2 (across the container film 3) and perform the different type inclusion inspection by the inspection device 22 in the post process after the pocket portions 2 are filled with the tablets 5 and the previous process before the cover film 4 is mounted to the container film 3.

In the configuration of irradiating and imaging the tablets 5 across the pocket portions 2 and performing the inspection, specularly reflected light that is reflected from the pocket portions 2 is likely to make shine and affect the inspection. The configuration of one or more embodiments of the present invention, however, reduces the possibility of such an issue.

Another modification may be configured to irradiate the tablets 5 and take the images of the tablets 5 across the pocket portions 2 from the container film 3-side of the PTP film 6 and perform the different type inclusion inspection by the inspection device 22 in a post process after the cover film 4 is mounted to the container film 3 and in a previous process before the PTP sheet 1 is punched out from the PTP film 6.

Another modification may be configured to irradiate the tablets 5 and take the images of the tablets 5 across the pocket portions 2 from the container film 3-side of the PTP sheet 1 conveyed by the conveyor 39 and perform the different type inclusion inspection by the inspection device 22 in a post process after the PTP sheet 1 is punched out from the PTP film 6.

In this case, in place of the configuration that the inspection device 22 is provided inside of the PTP packaging machine 10 (inline configuration), the inspection device 22 may be provided as a device separate from the PTP packaging machine 10 to perform offline inspection of the PTP sheet 1. In this modification, the inspection device 22 may be equipped with a conveyance unit configured to convey the PTP sheet 1.

Another modification may be configured to perform the different type inclusion inspection by the inspection device 22 in a previous process before the pocket portions 2 are filled with the tablets 5. For example, the modification may be configured to perform the inspection in a previous stage before the tablets 5 are supplied to the tablet filling device 21. In this case, the inspection device 22 may be provided as a device separate from the PTP packaging machine 10 to perform offline inspection of the tablets 5.

In the case of performing the offline inspection, a modification may be configured to perform the inspection in such a state that the PTP sheet 1 and the tablets 5 are not continuously conveyed but are at stop. From the viewpoint of enhancing the productivity, however, the inline inspection should be performed while the PTP film 6 or the container film 3 is conveyed continuously.

In the manufacturing field of the PTP sheet 1 or the like, there is a recent demand for increasing the speed of various inspections such as different type inclusion inspection, accompanied with an increase in the production rate. For example, an inspection performed on the PTP packaging machine 10 may be required to inspect 100 or more tablets 5 per second.

(e) The configurations of the illumination device 52 and the imaging device 53 are not limited to those described in the above embodiments. For example, a reflection type diffraction grating, a prism or the like may be employed as the spectral unit, in place of the two-dimensional spectroscope 62.

(f) The embodiments described above are configured to analyze the spectral data by principal component analysis (PCA). This technique is, however, not essential. Another known technique, such as PLS regression analysis may be employed to analyze the spectral data.

(g) The embodiments described above are configured to select a group having a highest density of luminance values with regard to one wavelength component (for example, a wavelength component of a band number "16" in the example of FIG. 14) as a dense spectral data group, among spectral data at a plurality of coordinate points on one tablet 5 in the dense spectrum obtaining process of step S13.

This configuration is, however, not essential. A modification may be configured to select groups respectively having highest densities of luminance values with regard to a plurality of wavelength components (for example, wavelength components of band numbers "16", "21" and "26" in the example of FIG. 14) and specifies a dense spectral data group by comprehensive evaluation of these selected groups.

(h) The method of selecting a group having a highest density of luminance values with regard to a predetermined wavelength component as a dense spectral data group among spectral data at a plurality of points is not limited to the procedure described in the above embodiments.

For example, the configuration of the above embodiments successively specifies a group having a highest density of luminance values with narrowing the range in a stepwise manner. More specifically, the embodiments are configured to calculate standard deviations with regard to luminance data groups respectively consisting of nine luminance data and specify a luminance data group having a minimum standard deviation (the primary minimum deviation selecting process of step S107), to calculate standard deviations with regard to luminance data groups respectively consisting of seven luminance data in the specified luminance data group and specify a luminance data group having a minimum standard deviation (the secondary minimum deviation selecting process of step S108), to calculate standard deviations with regard to luminance data groups respectively consisting of five luminance data in the specified luminance data group and specify a luminance data group having a minimum standard deviation (the tertiary minimum deviation selecting process of step S109), and to calculate standard deviations with regard to luminance data groups respectively consisting of three luminance data in the specified luminance data group and specify a luminance data group having a minimum standard deviation (the quaternary minimum deviation selecting process of step S110).

This procedure is, however, not essential. For example, one modification may omit the quaternary minimum deviation selecting process of step S110 and may specify a luminance data group consisting of five luminance data specified by the tertiary minimum deviation selecting process of step S109 as the group having the highest density of luminance values.

Another modification may omit the secondary minimum deviation selecting process of step S108 and the tertiary minimum deviation selecting process of step S109 and may calculate standard deviations with regard to luminance data groups respectively consisting of three luminance data in the luminance data group (nine luminance data) specified by the primary minimum deviation selecting process of step S107 and specify a luminance data group having a minimum standard deviation (the quaternary minimum deviation selecting process of step S110), so as to specify the group having the highest density of luminance values.

Another modification may be configured to settle a group having a highest density of luminance values by only one specification process. For example, this modified configuration may omit the primary minimum deviation selecting process of step S107, the secondary minimum deviation selecting process of step S108 and the quaternary minimum deviation selecting process of step S110 and perform only the tertiary minimum deviation selecting process of step S109 to calculate standard deviations with regard to luminance data groups respectively consisting of five luminance data and specify a luminance data group having a minimum standard deviation.

(i) The method of selecting the group having the highest density of luminance values with regard to the predetermined wavelength component as the dense spectral data group among the spectral data at the plurality of points is not limited to the method using the standard deviations as described in the above embodiments, but another method may be employed.

For example, a modification may be configured to divide luminance data with regard to a predetermined wavelength component in spectral data at a plurality of points into groups of predetermined luminance range widths and extract a group having a largest number of luminance data, so as to specify the group having the highest density of luminance values.

(j) According to the embodiments described above, the different type inclusion inspection with respect to the tablet 5 is performed by the configuration of performing the analysis of the dense average spectral data including the average values of the dense spectral data group.

This configuration is, however, not essential. A modification may be configured to select a median value of luminance values with regard to each wavelength component, specify a group of median values of the respective wavelength components as median spectral data with respect to the tablet 5, and perform an analysis of the median spectral data, so as to perform the different type inclusion section with respect to the tablet 5.

Another modification may be configured to select typical spectral data representing the tablet 5 among dense spectral data groups and perform an analysis of the selected typical spectral data, so as to perform the different type inclusion inspection with respect to the tablet 5.

For example, a procedure employable to select the typical spectral data may be a method of selecting spectral data in which a luminance value with regard to a predetermined wavelength component or a summation of luminance values with regard to a plurality of wavelength components is a median value among dense spectral data groups.

(k) The above embodiments are configured to perform the imaging process every time a predetermined amount of the container film 3 is conveyed and thereby to obtain spectral data at a plurality of positions in the film conveying direction (X direction) with regard to one tablet 5. This configuration is, however, not essential. A modification may be configured to obtain spectral data at only one position in the film conveying direction (X direction) with regard to one tablet 5. In this modified configuration, spectral data are obtained at a plurality of positions in the film width direction (Y direction) of the container film 3 with regard to one tablet 5.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 . . . PTP sheet, 2 . . . pocket portion, 3 . . . container film, 4 . . . cover film, 5 . . . tablet, 5D, 5E . . . tapered portions, 5F . . . score line, 10 . . . PTP packaging machine, 22 . . . inspection device, 52 . . . illumination device, 53 . . . imaging device, 54 . . . control processing device, 62 . . . two-dimensional spectroscope, 63 . . . camera, Q . . . spectral image, Qa . . . pixel, Qb . . . tablet pixel

What is claimed is:

1. An inspection device comprising:
    an illumination device that irradiates an object with near-infrared light;
    a spectroscope that disperses reflected light from the object irradiated with the near-infrared light;
    an imaging device that takes a spectroscopic image of the reflected light dispersed by the spectroscope; and
    a processor that:
        obtains spectral data at a plurality of points on the object based on the spectroscopic image obtained by the imaging device,
        selects, from among the spectral data at the plurality of points, a group having a highest density of luminance values of a predetermined wavelength component as a dense spectral data group, and
        performs a predetermined analysis for the object based on the dense spectral data group and detects a different type of object.

2. The inspection device according to claim 1, wherein the processor specifies, as the group having the highest density of luminance values from among the spectral data at the plurality of points, a group having a smaller standard deviation of the luminance values of the predetermined wavelength component.

3. A Press Through Package (PTP) packaging machine that manufactures a PTP sheet, the PTP packaging machine comprising:
    the inspection device according to claim 2;
    a pocket portion former that forms a pocket portion in a container film of a belt-like shape;
    a filler that fills an object into the pocket portion;
    a mounter that mounts a cover film onto the container film to close the pocket portion; and
    a separator that separates the PTP sheet from a belt-like body obtained by mounting the cover film to the container film.

4. The inspection device according to claim 1, wherein the processor further:
    sorts, in a predetermined order of either an ascending order or a descending order, the luminance values of the predetermined wavelength component in the spectral data at the plurality of points,
    performs a process of:
        calculating, in a first specific luminance value group consisting of a first predetermined number of luminance values of the predetermined wavelength component arrayed in the predetermined order, a standard deviation for each luminance value group consisting of a second predetermined number of consecutively arrayed luminance values, wherein the second predetermined number is smaller than the first predetermined number; and
        specifying a luminance value group having a minimum standard deviation as a second specific luminance value group, and
    specifies, as the group having the highest density of luminance values, a group of spectral data of a luminance value group obtained by repeating the process a predetermined number of times while replacing the second specific luminance value group with the first specific luminance value group.

5. A Press Through Package (PTP) packaging machine that manufactures a PTP sheet, the PTP packaging machine comprising:
    the inspection device according to claim 4;
    a pocket portion former that forms a pocket portion in a container film of a belt-like shape;
    a filler that fills an object into the pocket portion;
    a mounter that mounts a cover film onto the container film to close the pocket portion; and
    a separator that separates the PTP sheet from a belt-like body obtained by mounting the cover film to the container film.

6. A Press Through Package (PTP) packaging machine that manufactures a PTP sheet, the PTP packaging machine comprising:
    the inspection device according to claim 1;
    a pocket portion former that forms a pocket portion in a container film of a belt-like shape;
    a filler that fills an object into the pocket portion;
    a mounter that mounts a cover film onto the container film to close the pocket portion; and
    a separator that separates the PTP sheet from a belt-like body obtained by mounting the cover film to the container film.

* * * * *